United States Patent
Ilyas et al.

(10) Patent No.: US 12,326,911 B2
(45) Date of Patent: Jun. 10, 2025

(54) TECHNIQUES FOR PRESENTING CONTENT TO A USER BASED ON THE USER'S PREFERENCES

(71) Applicant: Primal Fusion Inc., Kitchener (CA)

(72) Inventors: Ihab Ilyas, Waterloo (CA); Mohamed A Soliman, San Mateo, CA (US)

(73) Assignee: Primal Fusion Inc., Kitchener (CA)

( * ) Notice: Subject to any disclaimer, the term of this patent is extended or adjusted under 35 U.S.C. 154(b) by 0 days.

(21) Appl. No.: 18/545,324

(22) Filed: Dec. 19, 2023

(65) Prior Publication Data

US 2024/0184839 A1 Jun. 6, 2024

Related U.S. Application Data

(63) Continuation of application No. 17/713,096, filed on Apr. 4, 2022, now Pat. No. 11,960,556, which is a continuation of application No. 16/523,106, filed on Jul. 26, 2019, now Pat. No. 11,294,977, which is a continuation of application No. 15/658,500, filed on Jul. 25, 2017, now Pat. No. 10,409,880, which is a continuation of application No. 14/729,958, filed on Jun. 3, 2015, now Pat. No. 9,715,552, which is a continuation of application No. 13/527,883, filed on Jun. 20, 2012, now Pat. No. 9,092,516, which is a continuation-in-part of application No. PCT/CA2012/000009, filed on Jan. 6, 2012, which is a continuation of application No. 13/345,637, filed on Jan. 6, 2012, now abandoned.

(Continued)

(51) Int. Cl.
*G06F 16/9535* (2019.01)
*G06F 16/2457* (2019.01)
*G06F 16/36* (2019.01)

(52) U.S. Cl.
CPC .... *G06F 16/9535* (2019.01); *G06F 16/24578* (2019.01); *G06F 16/36* (2019.01)

(58) Field of Classification Search
CPC . G06F 16/9535; G06F 16/24578; G06F 16/36
See application file for complete search history.

(56) References Cited

U.S. PATENT DOCUMENTS

| | | | | |
|---|---|---|---|---|
| 8,326,890 B2* | 12/2012 | Desbarats | ............... | G06Q 30/02 |
| | | | | 707/805 |
| 2008/0215543 A1* | 9/2008 | Huang | ................ | G06F 16/9535 |
| 2013/0007124 A1* | 1/2013 | Sweeney | ............. | G06F 16/3334 |
| | | | | 709/204 |

* cited by examiner

*Primary Examiner* — Debbie M Le
(74) *Attorney, Agent, or Firm* — Own Innovation Inc.; James W. Hinton; Osman Ismaili

(57) ABSTRACT

Techniques for presenting content to users. The techniques include: obtaining user context information including a first keyword; identifying, based on the first keyword, a first attribute and a second attribute among the plurality of attributes, the first attribute being a characteristic of the first keyword and the second attribute being another characteristic of the first keyword; obtaining, based on the user context information, at least one second-order user preference among attributes in the plurality of attributes including a preference between the first attribute and the second attribute; identifying a set of content items among the plurality of content items based on the first attribute and the second attribute; determining a ranking of content items in the set of content items based on the at least one second-order user preference; and presenting content items to the user in accordance with the ranking.

20 Claims, 17 Drawing Sheets

Related U.S. Application Data

(60) Provisional application No. 61/532,330, filed on Sep. 8, 2011, provisional application No. 61/498,899, filed on Jun. 20, 2011, provisional application No. 61/471,964, filed on Apr. 5, 2011, provisional application No. 61/430,810, filed on Jan. 7, 2011, provisional application No. 61/430,836, filed on Jan. 7, 2011.

Illustrative Relation Car

| ID | Make | Model | Color | Price | Deposit |
|---|---|---|---|---|---|
| $t_1$ | Honda | Civic | Red | 1800 | 500 |
| $t_2$ | Honda | Odyssey | Blue | 1500 | 300 |
| $t_3$ | Jeep | Liberty | Black | 5200 | 700 |
| $t_4$ | Jeep | Wrangler | Red | 5000 | 600 |
| $t_5$ | Ford | Focus | Black | 5100 | 600 |
| $t_6$ | Ford | Mustang | White | 1700 | 400 |

FIG. 2A

Illustrative Scopes
Obtained From Relation Car $R_1$: Select * from R where Make= 'Honda'

$R_2$: Select * from R where Make= 'Ford'

$R_3$: Select * from R where Color= 'Red'

$R_4$: Select * from R where Color= 'Black'

$R_5$: Select * from R where Price > 2000

$R_6$: Select * from R where Price < 2000

$f_{1,2}$ if ($t_1$.Price < $t_2$.Price)
  return 1
else if ($t_1$.Price > $t_2$.Price)
  return -1
else
  return ⊥

$f_{3,4}$ return 1

$f_{5,6}$ if ($t_5$.Color = 'Red' ∧ $t_6$.Color = 'Blue')
  return 1
else if ($t_6$.Make= 'Ford')
  return -1
else
  return ⊥

$f_{6,2}$ if ($t_6$.Make= 'Honda')
  return 1
else if ($t_6$.Price < $t_2$.Price)
  return -1
else
  return ⊥

$f_{1,5}$ return -1

FIG. 5

Conjoint Preferences Example

Make-Color Preferences

| Make | Color | |
|---|---|---|
| | Red | Blue |
| Honda | 1 | 3 |
| Toyota | 2 | 4 |

Make-Price Preferences

| Make | Price | |
|---|---|---|
| | <=2000 | >2000 |
| Honda | 1 | 3 |
| Toyota | 2 | 4 |

Make-Color Utilities

| Make | Color | |
|---|---|---|
| | Red (50) | Blue (35) |
| Honda (40) | 1 (90) | 3 (75) |
| Toyota (30) | 2 (80) | 4 (65) |

Make-Price Utilities

| Make | Price | |
|---|---|---|
| | <=2000 (30) | >2000 (10) |
| Honda (40) | 1 (70) | 3 (50) |
| Toyota (30) | 2 (60) | 4 (40) |

FIG. 6

Illustrative Mapping of a Partial
Order to Linear Extensions

Illustrative Preference Graph

Illustrative Pagerank-Based
Matrix for Prioritized Comparators $$\begin{pmatrix} \gamma_1 \\ \gamma_2 \\ \gamma_3 \\ \gamma_4 \\ \gamma_5 \\ \gamma_6 \end{pmatrix}^T = \alpha \begin{pmatrix} 0 & 0 & 0.25 & 0 & 0.25 & 0 \\ 0 & 0 & 0.25 & 0 & 0.25 & 0.5 \\ 0 & 0 & 0 & 0 & 0 & 0 \\ 0.5 & 1.0 & 0.25 & 1.0 & 0.25 & 0.5 \\ 0 & 0 & 0 & 0 & 0 & 0 \\ 0.5 & 0 & 0.25 & 0 & 0.25 & 0 \end{pmatrix} * \begin{pmatrix} \gamma_1 \\ \gamma_2 \\ \gamma_3 \\ \gamma_4 \\ \gamma_5 \\ \gamma_6 \end{pmatrix}^{T-1} + (1-\alpha) \begin{pmatrix} 1/6 \\ 1/6 \\ 1/6 \\ 1/6 \\ 1/6 \\ 1/6 \end{pmatrix}$$

FIG. 10

TECHNIQUES FOR PRESENTING CONTENT TO A USER BASED ON THE USER'S PREFERENCES

BACKGROUND

Information retrieval systems are capable of accessing enormous volumes of information. As a result, locating information of interest to users presents challenges. One such challenge is identifying information that may be of interest to users so that information may be presented to them without overwhelming users with irrelevant information. Even in environments, such as online search, where the user provides an explicit indication (e.g., a search query) of what information the user may be interested in, such an indication may not be sufficient to accurately identify the content which is appropriate to present to the user from among all the content that may be available to be presented to the user.

Conventional approaches to identifying information of interest to a user often shift the burden of finding such information to the user. For example, conventional approaches to search may involve presenting all potentially relevant results to a user in response to the user's search query. Subsequently, the user has to manually explore and/or rank these results in order to find the information of greatest interest to him. When the number of potentially relevant results is large, which is often the case, the user may be overwhelmed and may fail to locate the information he is seeking.

One technique for addressing this problem is to integrate a user's preferences into the process of identifying information of interest to the user. By presenting information to the user in accordance with his preferences, the user may be helped to find the information he is seeking. However, conventional approaches to specifying user preferences severely limit the ways in which user preferences may be specified, thereby limiting the utility of such approaches.

Consider, for example, a data exploration model adopted by many search services and illustrated in FIG. 1. Query interface 12 is used to collect query predicates in the form of keywords and/or attribute values (e.g., "used Toyota" with price in the range [$2000-$5000]). Query results are then sorted (14) on the values of one or more attributes (e.g., order by Price then by Rating) in a major sort/minor sort fashion. The user then scans (16) through the sorted query answers to locate items of interest, refines query predicates, and repeats the exploration cycle (18). This "Query, Sort, then Scan" model limits the flexibility of preference specification and imposes rigid information retrieval schemes, as highlighted in the following example.

Example 1

Amy is searching online catalogs for a camera to buy. Amy is looking for a reasonably priced camera, whose color is preferably silver and less preferably black or gray, and whose reviews contain the keywords "High Quality." Amy is a money saver, so her primary concern is satisfying her Price preferences, followed by her Color and Reviews preferences.

The data exploration model of FIG. 1 allows Amy to sort results in ascending price order. Amy then needs to scan through the results, which are sorted by price, comparing colors and inspecting reviews to find the camera that she wants. The path followed by Amy to explore search results is mainly dictated by her price preference, while other preferences are incorporated in the exploration task through Amy's effort, which can limit the possibility of finding items that closely match her requirements.

Conventional approaches to specifying user preferences suffer from a number of other drawbacks in addition to not simultaneously supporting preferences for multiple attributes (e.g., price, color, and reviews). For example, preference specifications may be inconsistent with one another. A typical example is having cycles (or "circularity") in preferences among first-order preferences (preferences among attributes of items such as preferring one car to another car based on the price or on brand). For instance, a user may indicate that a Honda is preferred to a Toyota, a Toyota is preferred to a Nissan, and a Nissan is preferred to a Honda. Even when first-order preferences are consistent, preferences among first-order preferences, termed second-order preferences (e.g., brand preferences are more important than price preferences) may result in further inconsistencies among specified preferences. Conventional information retrieval systems are unable to rank search results when preference specifications may be inconsistent.

SUMMARY

In some embodiments, a computer-implemented method for calculating a ranking of at least one item in a plurality of items is disclosed. The method comprises receiving user preferences comprising a plurality of first-order user preferences indicative of a user's preferences for items in the plurality of items, and at least one second-order user preference indicative of the user's preferences among first-order user preferences in the plurality of first-order user preferences. The method further comprises calculating, with at least one processor, a ranking of the at least one item in the plurality of items based, at least in part on, at least one data structure encoding a preference graph that represents the received user preferences, and identifying and outputting at least a subset of the plurality of items to a user, in accordance with the ranking.

In some embodiments, a system is disclosed. The system comprises at least one memory configured to store a plurality of tuples, each tuple in the plurality of tuples corresponding to an item in a plurality of items, and at least one data structure encoding a preference graph to represent user preferences, wherein the user preferences comprise a plurality of first-order user preferences indicative of a user's preferences among items in the plurality of items, and at least one second-order user preference indicative of the user's preferences among first-order user preferences in the plurality of first-order user preferences. The system further comprises at least one processor coupled to the at least one memory, the at least one processor configured to calculate a ranking of at least one item in the plurality of items based, at least in part on, the at least one data structure encoding the preference graph that represents the user preferences, and identify and output at least a subset of the plurality of items to a user, in accordance with the ranking.

In some embodiments, at least one computer-readable storage medium article is disclosed. The at least one computer-readable storage medium article stores a plurality of processor-executable instructions that, when executed by at least one processor, cause the at least one processor to perform a method of calculating a ranking for at least one item in a plurality of items. The method comprises receiving user preferences comprising a plurality of first-order user preferences indicative of a user's preferences among items in the plurality of items, and at least one second-order user preference indicative of the user's preferences among first-order user preferences in the plurality of first-order user preferences. The method further comprises calculating a ranking of the at least one item in the plurality of items based, at least in part on, at least one data structure encoding a preference graph that represents the received user preferences, and identifying and outputting at least a subset of the plurality of items to a user, in accordance with the ranking.

In some embodiments, a computer-implemented method for constructing at least one data structure encoding a preference graph that represents user preferences is disclosed. The preference graph comprises a first node for a first item in a plurality of items, a second node for a second item in the plurality of items, and an edge between the first node and the second node. The method comprises receiving a plurality of first-order user preferences indicative of user preferences among values of attributes of items in the plurality of items, receiving at least one second-order user preference indicative of user preferences among the attributes of items in the plurality of items, and computing, using at least one processor, a weight for the edge between the first node and the second node based at least in part on the plurality of first-order user preferences and the at least one second-order user preference, wherein the weight is indicative of a degree of preference for the first item over the second item.

In some embodiments, a system for constructing at least one data structure encoding a preference graph that represents user preferences is disclosed. The preference graph comprising a first node for a first item in a plurality of items, a second node for a second item in the plurality of items, and an edge between the first node and the second node. The system comprises at least on processor configured to receive a plurality of first-order user preferences indicative of user preferences among values of attributes of items in the plurality of items, receive at least one second-order user preference indicative of user preferences among the attributes of items in the plurality of items, and compute a weight for the edge between the first node and the second node based at least in part on the plurality of first-order user preferences and the at least one second-order user preference, wherein the weight is indicative of a degree of preference for the first item over the second item.

In some embodiments, at least one computer-readable storage medium article is disclosed. The at least one computer-readable storage medium article stores a plurality of processor-executable instructions that, when executed by at least one processor, cause the at least one processor to perform a method for constructing at least one data structure encoding a preference graph that represents user preferences. The preference graph comprises a first node for a first item in a plurality of items, a second node for a second item in the plurality of items, and an edge between the first node and the second node. The method comprises receiving a plurality of first-order user preferences indicative of user preferences among values of attributes of items in the plurality of items, receiving at least one second-order user preference indicative of user preferences among the attributes of items in the plurality of items, and computing a weight for the edge between the first node and the second node based at least in part on the plurality of first-order user preferences and the at least one second-order user preference, wherein the weight is indicative of a degree of preference for the first item over the second item.

In some embodiments, a computer-implemented method for obtaining user preferences is disclosed. The method comprises receiving user context information associated with at least one user; identifying, based at least in part on the received user context information, a plurality of attributes of items in a plurality of item; obtaining, using at least one processor, at least one first-order user preference based at least in part on a first input provided by the at least one user, wherein the plurality of first-order user preferences comprises a preference for a first attribute in the plurality of attributes; and obtaining, using the at least one processor, at least one second-order user preference based at least in part on a second input provided by the at least one user, wherein the at least one second-order user preference comprises a preference among attributes in the plurality of attributes.

In some embodiments, a system for obtaining user preferences is disclosed. The system comprises at least one processor configured to receive user context information associated with at least one user; identify, based at least in part on the received user context information, a plurality of attributes of items in a plurality of items; obtain, at least one first-order user preference based at least in part on a first input provided by the at least one user, wherein the plurality of first-order user preferences comprises a preference for a first attribute in the plurality of attributes; and obtain at least one second-order user preference based at least in part on a second input provided by the at least one user, wherein the at least one second-order user preference comprises a preference among attributes in the plurality of attributes.

In some embodiments, at least one computer-readable storage medium article is disclosed. The at least one computer-readable storage medium article stores a plurality of processor-executable instructions that, when executed by at least one processor, cause the at least one processor to perform a method for obtaining user preferences. The method comprises receiving user context information associated with at least one user; identifying, based at least in part on the received user context information, a plurality of attributes of items in a plurality of items; obtaining, using at least one processor, at least one first-order user preference based at least in part on a first input provided by the at least one user, wherein the plurality of first-order user preferences comprises a preference for a first attribute in the plurality of attributes; and obtaining, using the at least one processor, at least one second-order user preference based at least in part on a second input provided by the at least one user, wherein the at least one second-order user preference comprises a preference among attributes in the plurality of attributes.

In some embodiments, a computer-implemented method for specifying user preferences in a semantic network encoded in at least one data structure is disclosed. The method comprises receiving, using at least one processor, a plurality of first-order user preferences for at least one concept in a semantic network, wherein the plurality of first-order user preferences are indicative of a user's preferences among children of attributes of the at least one concept in the semantic network; receiving, using the at least one processor, at least one second-order user preference for the at least one concept in the semantic network, wherein the at least one second-order user preference is indicative of the user's preferences among attributes of the at least one concept; and performing at least one semantic processing act by using the semantic network, the plurality of first-order user preferences, and the at least one second-order user preference.

In some embodiments, a system for specifying user preferences in a semantic network encoded in at least one data structure is disclosed. The system comprises at least one processor configured to receive a plurality of first-order user preferences for at least one concept in a semantic network, wherein the plurality of first-order user preferences are indicative of a user's preferences among children of attributes of the at least one concept in the semantic network; receive at least one second-order user preference for the at least one concept in the semantic network, wherein the at least one second-order user preference is indicative of the user's preferences among attributes of the at least one concept; and perform at least one semantic processing act by using the semantic network, the plurality of first-order user preferences, and the at least one second-order user preference.

In some embodiments, at least one computer-readable storage medium article is disclosed. The at least one computer-readable storage medium article stores a plurality of processor-executable instructions that, when executed by at least one processor, cause the at least one processor to perform a method for specifying user preferences in a semantic network encoded in at least one data structure. The method comprises receiving a plurality of first-order user preferences for at least one concept in a semantic network, wherein the plurality of first-order user preferences are indicative of a user's preferences among children of attributes of the at least one concept in the semantic network; receiving at least one second-order user preference for the at least one concept in the semantic network, wherein the at least one second-order user preference is indicative of the user's preferences among attributes of the at least one concept; and performing at least one semantic processing act by using the semantic network, the plurality of first-order user preferences, and the at least one second-order user preference.

The foregoing is a non-limiting summary of the invention, which is defined by the attached claims.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 2A is a diagram illustrating a relation, in accordance with some embodiments of the present invention.

FIG. 5 is a diagram illustrating scope comparators, in accordance with some embodiments of the present invention.

FIG. 6 is a diagram illustrating conjoint preferences, in accordance with some embodiments of the present invention.

FIG. 10 is a diagram of an illustrative page-rank based matrix for prioritized comparators, in accordance with some embodiments of the present invention.

DETAILED DESCRIPTION

Figure 1:
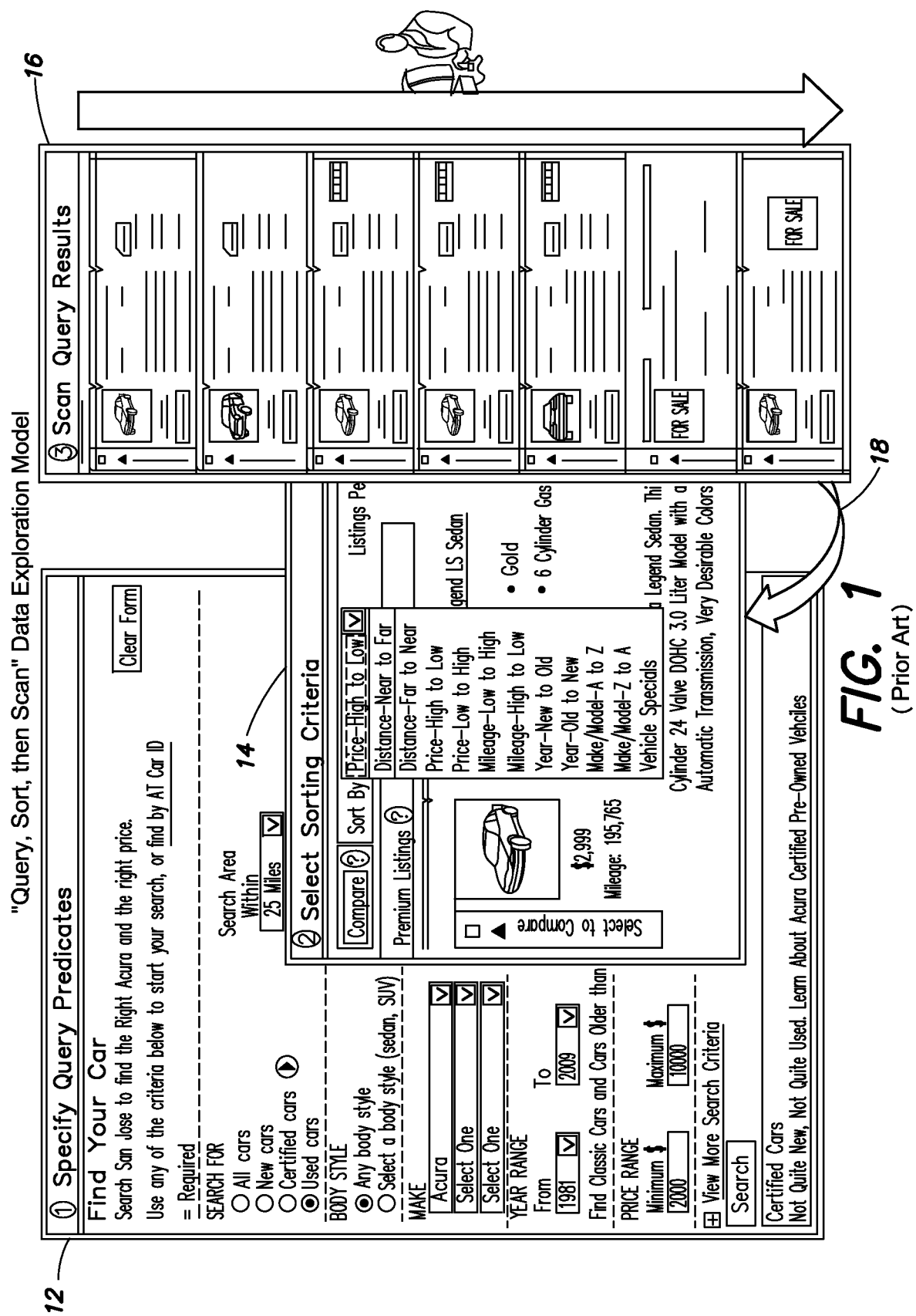
FIG. 1 is a diagram of a "query, sort, then scan" data exploration model, in accordance with prior art.

Inadequate incorporation of preferences in conventional information retrieval systems is due at least partly to the inability of these systems to integrate different types of preferences. For instance, in the above-described example, preferences include an ordering on all prices (a "total order" preference), an ordering between some, but not all, colors (a "partial order" preference), a Boolean predicate for the presence of the words "High Quality" in the reviews, and an indication that price is more important than the other preferences.

As well, it may be useful to specify different types of preferences when a user may have precise preferences for information in one domain (but not another domain—e.g., because the user may possess a large amount of knowledge about that one domain, but not another). Such precise preferences may be specified, for example, in the form of one or more scoring functions. The same user may have less precise preferences for information in another domain because the user may not possess the same degree of knowledge about the other domain. In this case, preferences may be specified, for example, in the form of one or more partial orders on attribute values. There are many instances in which the user may need to specify both types of preferences (i.e., using a scoring function and using a partial order), as shown in Example 2 below.

Example 2

Alice is searching for a car to buy. Alice has specific preferences regarding sports cars, and more relaxed preferences regarding SUVs. Alice supplies values scores to rank sports cars, and a set of partial orders encoding SUVs preferences. Alice expects reported results to be ranked according to her preferences.

A system capable of integrating different preference types and identifying information of interest to a user or users, in accordance with preferences specified by the user(s), may address some of the above-discussed drawbacks of conventional approaches to information retrieval. However, not every embodiment addresses every one of these drawbacks, and some embodiments may not address any of them. As such, it should be appreciated that embodiments of the invention are not limited to addressing all or any of the above-discussed drawbacks of these conventional approaches to information retrieval.

Accordingly, in some embodiments, a preference language is provided for specifying different types of user preferences among items. A system, implemented in accordance with some embodiments, may assist a user to specify preferences using the preference language. The specified preferences may be used by the system to identify information of interest to the user. To this end, in some embodiments, the specified preferences may be used to construct a preference model that, in turn, may be used to produce a ranking of one or more items in accordance with any user preferences.

Items may be any suitable objects or information (i.e., they may be tangible or intangible) about which a user may express preferences. In some embodiments, an item may be any product that may be manufactured, sold, and/or purchased. For example, an item may be a car or an airplane ticket and a user (e.g., a consumer) may have preferences for one car over another car and/or may prefer one airplane ticket to another airplane ticket. In some embodiments, an item may comprise information. Users may prefer one item to another item based at least in part on the information that these items contain. For example, items may include content (e.g., video content, audio content, one or more images, one or more webpages, text, etc.) and the user may prefer some content to other content. As another example, items may include metadata about content. As another example, a user may prefer to see a webpage that contains information related to cars over a webpage that contains information related to bicycles. A preference model may be used to identify information of interest to the user by ranking one or more of such items in accordance with any user preferences.

In some embodiments, where semantic processing techniques may be used to identify information of interest to a user or users, an item may be represented by one or more entities in a knowledge representation. Such a knowledge representation may be used by one or more semantic processing techniques to identify information of interest to the user(s). An item may be represented by an entity or entities in any suitable type of knowledge representation and, indeed, semantic processing techniques make use of a broad range of knowledge representations including, but not limited to, structured controlled vocabularies such as taxonomies, thesauri, and faceted classifications; formal specifications, such as semantic networks and ontologies; and unstructured forms, such as documents based in natural language.

While it is not intended that the claimed invention be limited to processing specific knowledge representations in accordance with user preferences, a preferred form is the type of formal specification referred to as a semantic network. Semantic networks are explained in many sources, noteworthy among them being U.S. Publication No. 2010/0235307, titled "Method, System, And Computer Program For User-Driven Dynamic Generation of Semantic Networks and Media Synthesis," filed on, published on Sep. 16, 2010, which is hereby incorporated by reference in its entirety.

In some embodiments, a semantic network may be represented as a data structure embodying (or representing) a directed graph comprising vertices or nodes that represent concepts, and edges that represent semantic relations between the concepts. The data structure embodying a semantic network may be encoded (i.e., instantiated) in one or more non-transitory, tangible computer-readable storage medium articles. As such, a semantic network may be said to comprise one or more concepts. Each such concept may be represented by a data structure storing any data associated with one or more nodes in the semantic network representing the concept. An edge in the directed graph (i.e., its encoded instantiation in the data structure) may represent any of different types of relationships between the concepts associated with the two nodes that the edge connects.

Accordingly, in embodiments where items may be represented by one or more entities in a knowledge representation, items may be represented, at least in part, by one or more concepts in a semantic network. For example, an item may be represented by a concept and one or more of its descendants. As a specific example, an item may be represented by a concept, children of the concept, and grandchildren of the concept. Though it should be appreciated that an item may be represented by any entity or entities in a semantic network as aspects of the present invention are not limited in this respect.

In embodiments where items may be represented by one or more entities in a knowledge representation (e.g., a semantic network), semantic processing techniques may be used to perform any suitable type of semantic processing in accordance with user preferences. As one non-limiting example, semantic processing techniques may be used to identify information of interest to a user at least in part by identifying concepts in the semantic network that are of interest to the user. To this end, user preferences may be used to construct a preference model that, in turn, may be used to produce a ranking of one or more concepts in accordance with any user preferences. As another non-limiting example, semantic processing techniques may be used to augment a semantic network by synthesizing one or more new concepts based at least in part on user preferences. Synthesis techniques may rely on preference information and/or a preference model, constructed in accordance with techniques described herein, when synthesizing one or more knowledge representations and/or presenting knowledge representations to a data consumer. To this end, the preference model may be used to produce a ranking of one or more concepts in a semantic network or the preference may be used for this purpose in any other suitable way.

Any of the above-described types of items may comprise, or have associated with it, one or more attributes. In some embodiments, an attribute of an item may be related to the item and may be a characteristic of the item. An attribute of an item may be a characteristic descriptive of the item. For example, if an item is an item that may be purchased (e.g., a car, a computer, etc.), an attribute of the item may be a price related to the item. As another example, if an item comprises information (e.g., a movie, music, etc.), an attribute of the item may be a genre of the content (e.g., horror movies, bluegrass music, etc.) or any other suitable characteristic of the content. In some instances, an attribute of an item may identify the item. For example, an attribute of an item may be an identifier (e.g., name, serial number, or model number) of the item.

In some embodiments, attributes may be numerical attributes or categorical attributes. Numerical attributes may comprise one or more values. For instance a numerical attribute may comprise a single number (e.g., 5) or a range of numbers (e.g., 1-1000). Categorical attributes may also comprise one or more values. For instance, a categorical value for the category "Color" may comprise a single color (e.g., "Red") or a set of colors (e.g., {"Red", "Green" }). Though, it should be recognized that attribute values are not limited to being numbers and/or categories and may be any of numerous other types of values. For instance, values may comprise alphabetic and alphanumeric strings. Though, it should be appreciated that, in some embodiments, attributes are not limited to being numerical attributes or categorical attributes as the case may be when an item is an element of a knowledge representation. In that case, an attribute of an item may be another element of the knowledge representation, as described below.

Figure 2B:
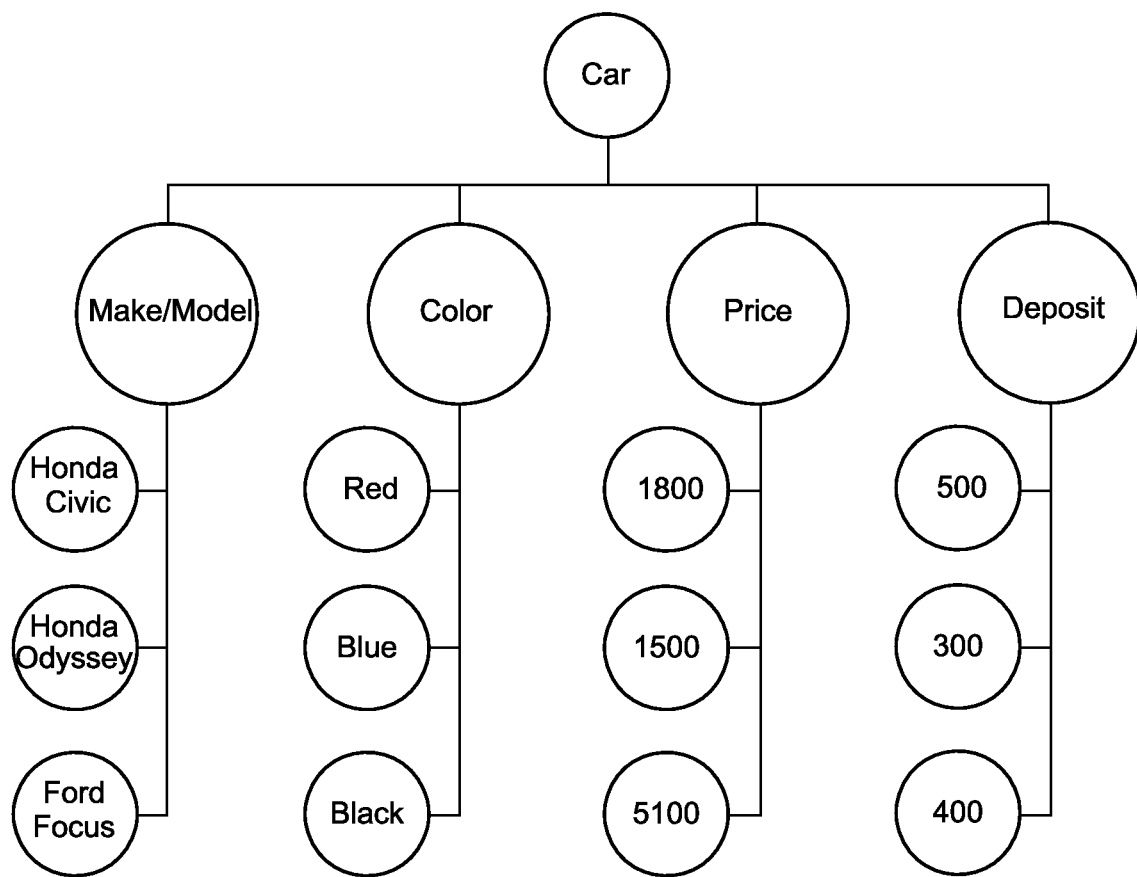
FIG. 2B is a diagram illustrating a semantic network associated with a portion of the relation illustrated in FIG. 2A.

In some embodiments, where an item is represented at least in part by a concept in a semantic network (e.g., a concept and one or more of its descendants), an attribute of the item may be an attribute of the concept. In turn, an attribute of a concept in a semantic network may be any of numerous types of entities in the semantic network. An attribute of a concept may be an entity in the semantic network, which is indicative of one or more characteristics of the concept. Additionally or alternatively, attributes of a concept may correspond to other concepts in the semantic network and, for example, may correspond to children of the concept. For instance, as shown in FIG. 2B, the concepts "Make/Model," "Color," "Price," and "Deposit" are attributes of the concept "Car" and the concepts "Red" "Blue" and "Black" are attributes of the concept "Color." It should also be appreciated that in some embodiments, concepts in a semantic network may be defined in terms of compound levels of abstraction through their relationships to other entities and structurally in terms of other, more fundamental knowledge representation entities such as keywords and morphemes. In such embodiments, these more fundamental knowledge representation entities such as keywords, morphemes and other entities that comprise concepts may be attributes of the concept.

In some embodiments, an item may be represented by one or more tuples comprising information associated with the item. For example, a tuple may comprise values for one or more attributes associated with the item. In some cases, a tuple representing an item may comprise a value for each attribute associated with the item. In other cases, a tuple representing an item may comprise a value for only some of the attributes associated with the item. The values may be of any suitable type and may depend on the type(s) of attributes associated with the item.

FIG. 2A shows an illustrative example of a set of items, each item being represented by a tuple comprising values for the attributes of the item. In the illustrative example of FIG. 2A, each item is a car and is associated with six attributes: "ID," "Make," "Model," "Color," "Price," and "Deposit." Though in this example all items share the same attributes, this is not a limitation of aspects of the present invention as different items may have different attributes from one another and some attributes may have unknown values. In this illustrated example, each item is represented by a tuple (i.e., a set) of attribute values. Accordingly, the first item is represented by the first set of attribute values. For instance, the first item is represented by the tuple in the first row of the table shown in FIG. 2A. As illustrated, this first item is an $1600 Red Honda Civic identified by identifier "$t_1$". A deposit of $500 may be required to purchase this car.

As previously mentioned, aspects of the present invention are not limited to representing items using tuples and, in some embodiments, items may be represented using knowledge representations such as semantic networks. In some instances, items may be represented using tuples and/or semantic networks. For example, as shown in FIG. 2B, items represented using tuples in FIG. 2A may be represented by one or more entities in a semantic network. Each of the items shown in FIG. 2A is a car and the semantic network shown in FIG. 2B comprises a concept "car." In FIG. 2B, the concept "car" is shown as having attributes "Make/Model," "Color," "Price," and "Deposit" corresponding to some of the attributes of the items shown in FIG. 2A. In addition, values of attributes shown in FIG. 2A correspond to children of the attributes of the concept "car" in the semantic network of FIG. 2B. As such, in this illustrative example, the concept "car," children of the concept "car," and the grandchildren of the concept "car" collectively represent items shown as being represented by tuples in FIG. 2A. It should be appreciated that the illustrative semantic network shown in FIG. 2B corresponds only to a portion of the information shown in FIG. 2A; but this is for purposes of clarity only, as aspects of the present invention are not limited in this respect.

It should also be appreciated that, in some instances, a set of items may be represented alternatively using either a relation comprising one or more tuples or a knowledge representation such as a semantic network. FIGS. 2A and 2B provide one such example. However, in other instances, only one type of representation may be used. This may be done for any of numerous reasons. For example, it may be more computationally efficient to manipulate data structures associated with one representation than with another representation. Additionally or alternatively, it may be more convenient to represent a set of items using one representation over another.

A user may express preferences for one item over another item in a set of items. As discussed below, user preferences may be of any suitable type and may be first-order user preferences, second-order user preferences, and even further-order preferences.

In some embodiments, first-order preferences may be preferences expressed with respect to values of attributes of items. For example, a first-order preference may be a preference for an item over another item based on values of an attribute of the two items. For instance, a first-order preference may indicate that one item (e.g., a car) with a lower price (value of the attribute "price") is preferred to another item (e.g., another car) with a higher price (a higher value of the attribute price). As another example, a first-order preference may indicate that an item (e.g., a car) that is red (value of the attribute "color") is preferred to another item (e.g., another car) that is blue (a different value of the attribute "color").

Another type of preference that may be specified is a second-order preference. In some embodiments, second-order preferences may indicate which attributes are more important to a user. As such, second-order preferences may indicate which first-order preferences are preferred by the user, if first-order preferences have been specified. For example, second-order preferences may indicate that the price of a car may be more important to a user than the color of the car. As such, if first-order preferences A were specified for values of the "price" attribute and first-order preferences B were specified for values of "color" attribute, the second-order preferences may indicate that first-order preferences A are preferred to first-order preferences B.

In some embodiments, where an item is represented at least in part by a concept in a semantic network, user preferences associated with the item may be specified by specifying user preferences for the concept. For instance, as previously described with respect to the illustrative examples of FIGS. 2A and 2B, the items shown in FIG. 2A are represented at least in part by the concept "car" shown in FIG. 2B. As such, user preferences for the items shown in FIG. 2A may be specified by specifying user preferences for the concept "car" shown in FIG. 2B.

User preferences for a concept may be specified at least in part by specifying preferences among descendants of the concept. For example, first-order order preferences for a concept may be specified based at least in part by specifying preferences among descendants of its attributes. For instance, in the illustrative example of FIG. 2B, first-order preferences for the concept "car" may be used to express a preference for one car over another car by specifying preferences among descendants (e.g., children, grandchildren, great-grandchildren, etc. . . . ) of an attribute of the concept "car." As a specific example, first-order preferences for the concept "car" may be used to express a preference for a less expensive car than a more expensive car by indicating that a smaller value among children of the attribute "price" is preferred over a larger value. As another specific example, first-order preferences for the concept "car" may be used to express a preference for a color of the car by indicating that, among the descendants of attribute "color," the node "red" is preferred to the node "blue." As another example, second-order preferences for a concept may be specified based at least in part by specifying preferences among its attributes. In the illustrative example of FIG. 2B, for instance, second-order preferences for the concept "car" may indicate that the attribute "price" is preferable to the attribute "color."

There may be many different types of first-order and second-order preferences. These types of preferences, along with other aspects of first-order and second-order preferences, are discussed in greater detail below in Sections II and III, respectively.

An information retrieval system may be any system configured to identify and provide, from a larger set of digital content, information which may be of interest to one or more users. In some embodiments, an information retrieval system may be configured to obtain user context information associated with one or more users. As described in greater detail below in Section VIII, user context information may comprise any information related to the user(s) and/or provided by the user(s). For example, in some embodiments, user context information may comprise one or more search queries received from one or more users; the queries may indicate content that the user(s) may be seeking. An information retrieval system may comprise and/or interface with a search engine such as an Internet search engine or a domain-specific search engine (e.g., a search engine created to search a particular information domain such as a company's or institution's intranet, or a specific subject-matter information repository) to process such queries. In another example, an information retrieval system may comprise and/or interface with a database system that may allow user queries.

In embodiments where a user or users provide queries to an information retrieval system, such queries may be of numerous types of queries. For instance, a query may comprise one or more keywords indicating what the user is seeking. In some cases, a query may comprise user preferences. Though, it should be appreciated that user preferences may be specified separately and/or independently from any user query provided to the information retrieval system. For example, a user may specify preferences that may apply to multiple user queries. As another example, a user may specify preferences without providing any query. The specified preferences may comprise preferences of any suitable type such as first-order and/or second-order user preferences.

Regardless of the types of preferences that a user may wish to specify, an information retrieval system may assist a user to specify preferences. In some embodiments, an information retrieval system may assist a user to specify preferences using the preference language. Some example approaches to how an information retrieval system may assist a user to specify preferences are described in greater detail in Sections I and VI, below.

After user-specified preferences are obtained (e.g., from a user-specified query or any other suitable source), a preference model may be constructed from these preferences. The preference model may be constructed from different types of preferences and may be constructed from first-order preferences of different types and/or from second-order preferences of different types.

A preference model may be represented by a data structure encoding the preference model. The data structure may comprise any data necessary for representing the preference model and, for example, may comprise any parameters associated with the preference model.

A data structure encoding a preference model may be stored on any tangible computer-readable storage medium. The computer-readable storage medium may be any suitable computer-readable storage medium and may be accessed by any physical computing device that may use the preference model encoded by the data structure.

In some embodiments, the preference model may be a graph-based preference model and the data structure encoding the preference model may encode a graph, termed a preference graph, characterizing the graph-based preference model. The preference graph may comprise a set of nodes (vertices) and a set of edges connecting nodes in the set of nodes. The edges may be directed edges or may be undirected edges. Accordingly, the data structure encoding the preference graph may encode the preference graph by encoding the graph's vertices and edges. Any of numerous data structures for encoding graphs, as are known in the art, may be used to encode the preference graph, as the invention is not limited in this respect.

In some embodiments, nodes of the graph may be associated with items. For instance, a node in the graph may be associated with a tuple that, in turn, represents an item. The graph may represent items that are related with one or more keywords in a query. For instance, a set of items may be selected in response to a user-provided query. It should be appreciated that, in embodiments where items are represented by one or more entities in a semantic network, the preference is not the same as the graph used to represent a semantic network.

A first-order preference for one item over another item may be represented as an edge in the preference graph, with the edge connecting nodes associated with the tuples associated with the two items. A weight may be associated to each edge in the preference graph to provide an indication of a degree of preference for one of the nodes terminating the edge. The weight may be computed based on first-order and/or second preferences. Aspects of a graph-based preference model, including how such a preference model may be constructed from user-specified preferences, are described in greater detail in Sections IV and VII, below.

The preference model may be used to obtain a ranking of items in a set of items. A graph-based preference model may be used to construct such a ranking in any of numerous ways. For instance, a complete directed graph may be obtained from the graph-based preference model and a ranking of items may be obtained based at least in part on the completed directed graph. As another example, a Markov-chain based algorithm may be applied to the graph-based preference model to obtain a ranking of items. These and other approaches to obtaining a ranking of items in a set of items from a preference model are described in greater detail in Section V, below.

It should be appreciated that although a preference graph may be a convenient abstraction, which is helpful for reasoning about user preferences, in practice, a preference graph may be implemented on a physical system via at least one data structure that may encode the preference graph. Similarly, many constructs described below (e.g., relations, scopes, scope comparators, etc.) are convenient abstractions used in various fields such as computer science and information retrieval, but each such construct typically is realized, in practice, by one or more data structures representing data characterizing the construct and/or processor-executable instructions for carrying out functions associated with the construct. Similarly, although a knowledge representation such as a semantic network may be a convenient abstraction, which is helpful for reasoning about representing knowledge, in practice, a semantic network and/or other knowledge representation may be implemented on a physical system via at least one data structure that may encode the semantic network and/or other knowledge representation. Such data structures and processor-executable instructions may be encoded on any suitable tangible computer-readable storage medium article or articles. Such data structures provide a physical instantiation in which a physical memory holds information organized according to certain rules to facilitate use of the information by any software program that assumes such organization.

Accordingly, for ease of reading, every reference to a construct (e.g., a graph, a node, an edge, a relation, scope, scope comparator, semantic network, concept, knowledge representation, etc.) is a reference to one or more data structures encoding the construct and/or processor-executable instructions that when executed by a processor perform functions associated with the construct, since explicitly referring to such data structures and processor-executable instructions for every reference to a construct is tedious.

It should also be appreciated that the above-described embodiments of aspects of described concepts can be implemented in any of numerous ways. For example, the embodiments may be implemented using hardware, software, or a combination thereof. When implemented in software, the software code may be embodied as stored program instructions that may be executed on any suitable processor or collection of processors (e.g., a microprocessor or microprocessors), whether provided in a single computer or distributed among multiple computers.

Software modules comprising stored program instructions may be provided to cause one or more processors to perform any of numerous of tasks in accordance with some of the disclosed embodiments. For example, one or multiple software modules for constructing a preference model may be provided. As another example, software modules for obtaining a ranking for a set of items based on (a data structure representing) the preference model may be provided. As another example, software modules comprising instructions for implementing any of numerous functions associated with an information retrieval system may be provided. Though, it should be recognized that the above examples are not limiting and software modules may be provided to perform any functions in addition to or instead of the above examples.

I. Design Goals

In some embodiments, an information retrieval system that utilizes user preferences may reflect some or all of the following design goals:

Guidance: The system may assist users to formulate their preferences. To this end, the system may provide interactive preference management capability. For instance, the system may provide users with information to help users specify and/or modify preferences. As a specific example, the system may provide users with information about how to modify their preferences to widen or narrow the scope of their search. As another specific example, the system may provide users with information about how to modify their preferences such that the ranking of items presented to a user is modified. Though, these are only examples and the system may aid the user to formulate their preferences in any of numerous ways as described in greater detail below, in Section VI.

Flexibility: Specification of different types of preferences may be supported for arbitrary subsets of items, sometimes referred to as "contexts." The system may accept natural descriptions of preferences and map these descriptions into preference constructs.

Provenance: The system may be able to provide justification of how search results are generated and ranked by relating generated results to input preferences.

Figure 3:
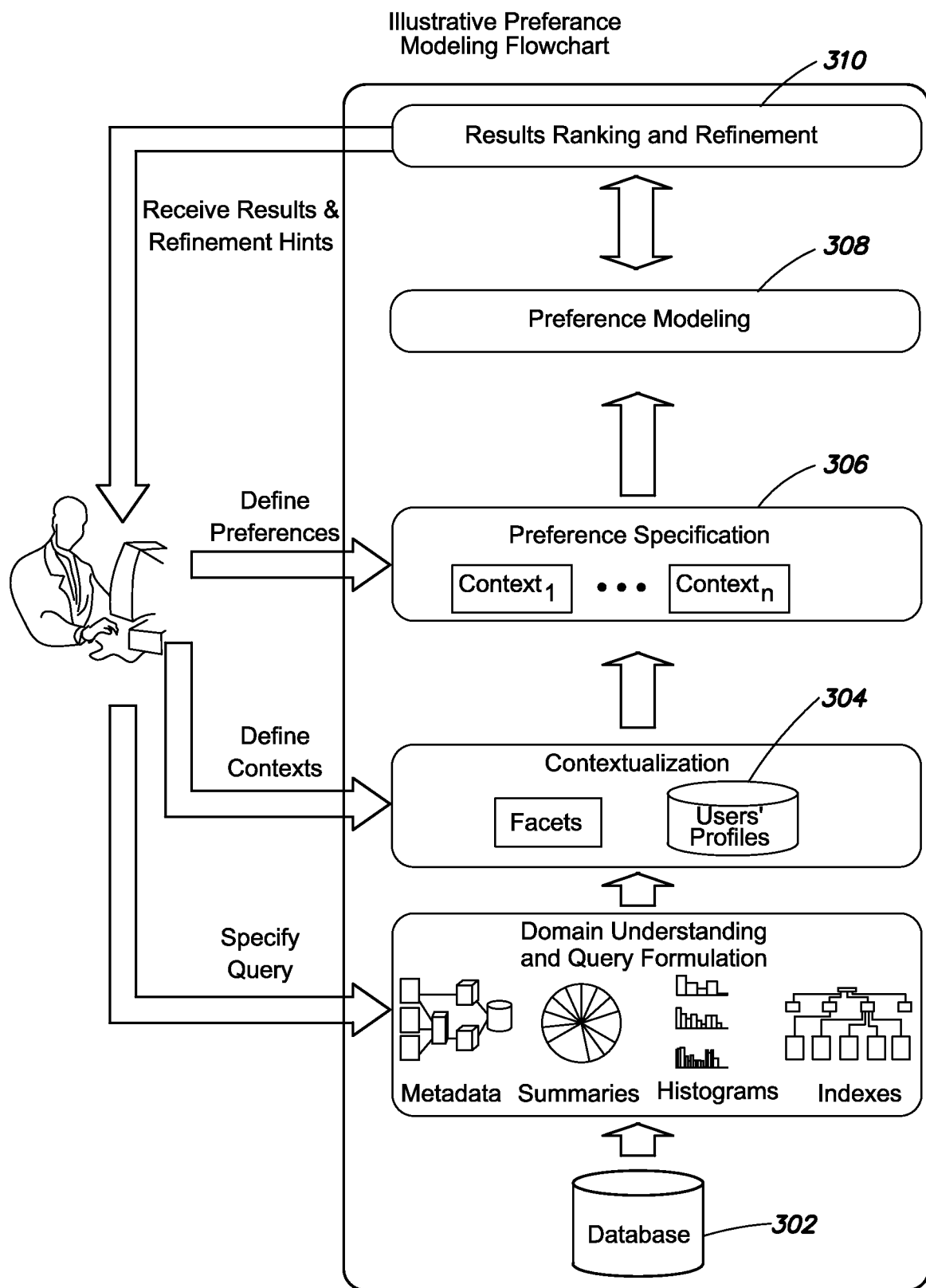
FIG. 3 is a flowchart of an illustrative preference modeling process, in accordance with some embodiments of the present invention.

FIG. 3 illustrates a flowchart for an example process of modeling preferences that reflects the above-mentioned design goals. As illustrated in FIG. 3, an information retrieval system may receive a query from one or more users. For instance, the information retrieval system may comprise or be coupled to a database system or a search engine and the query may comprise one or more keywords.

Toward the guidance goal, the system may assist a user to specify preferences. In some embodiments, such support may be based on pre-computed summaries, termed "facets," that may be used for guiding information retrieval. Each facet may be associated with a number that may provide the user with an estimate on the expected number of results. Accordingly, facets may allow a user to get a quick and dirty view of the underlying set of items and/or domain, and how search results may be affected by tuning preferences.

For example, the system may comprise a memory 302 configured to store a plurality of tuples (recall that each tuple comprises one or more values for one or more attributes) and may receive a range of desired values for an attribute from a user. In response, the system may output a value indicative of a number of tuples comprising a value for the attribute such that the value is in the range of values. As a specific example, for a categorical attribute, a facet may comprise a possible attribute value (e.g., 'Color=Red'), while for a numerical attribute, a facet may comprise a range of possible values (e.g., 'Price in the range [$1000-$5000]'). Moreover, the user may be able to define custom facets as Boolean conditions over multiple attributes (e.g., 'Color=Red AND price <$5000'). The system may associate a number to each of these facets, the number indicating an expected number of tuples consistent with these facets.

Toward the flexibility goal, the system may adopt the concept of contextualized preferences, where a user can assign different preference specifications to different subsets (contexts) of items 306. A user may define a context by using predetermined facets or by defining custom facets. As discussed below in Sections II and III, the user has the flexibility of expressing first-order and second-order preferences within and across contexts. Contextualized preferences 306 may also part of a user's profile 304, which may be ascertained by any of the techniques disclosed herein as well as those disclosed in U.S. Non-Provisional application Ser. No. 12/555,293, filed Sep. 8, 2009, and titled Synthesizing Messaging Using Context Provided By Consumers, which is hereby incorporated by reference in its entirety. This way, they may be loaded, saved, and/or refined upon the user's request.

Toward the provenance goal, the information retrieval system illustrated in FIG. 3 may maintain information regarding which preferences among the input preferences, affect the relative order of each pair of items in the final results ranking. This may be done in any of numerous ways and, for example, may be done by modeling of preferences using a preference model 308. This feature may be useful for the analysis and refinement 310 of preferences in different scenarios. Examples include finding preference constructs that have dominating effect on results' ranking, decreasing/increasing the influence of some preference constructs, and understanding the effect of removing a certain preference construct.

Additional ways in which an information retrieval system may assist a user to input preferences are discussed below in Section VI.

II. Specifying First-Order Preferences

In some embodiments, the preference language may be based on capturing pairwise preferences on different granularity levels. In some embodiments, at least some items' descriptions may follow a relational model, where each item may be represented as a tuple. Preferences may be cast against a relation R with a known schema. Though, it should be appreciated that first-order preferences may be specified in cases where an item may not be represented as a tuple. For example, first-order preferences may be specified for items represented using one or more entities in a knowledge representation. However, for ease of presentation, the discussion below treats the case of how to specify first-order preferences when items are represented by tuples.

A context for expressing first-order preferences, termed a "scope," may be defined in accordance with the following definition:

Definition 1 [Scope]: A scope $R_i$ is an arbitrary non-empty subset of tuples in R.

Figure 4:
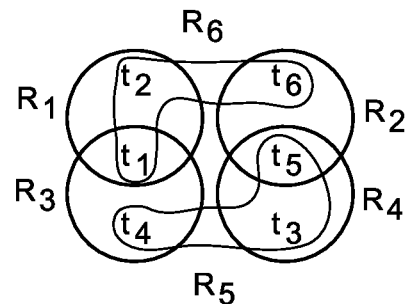
FIG. 4 is a diagram illustrating scopes obtained from a relation, in accordance with some embodiments of the present invention.

A scope defines a Boolean membership property that restricts the space of all possible tuples to a subset of tuples that are interesting for building preference relations. Such a membership property may be defined using a SQL query posed against R. For example, FIG. 4 shows six different scopes $R_1, \ldots R_6$ in the relation "Car" illustrated in FIG. 2A, where scopes are defined using SQL queries. Though, it should be recognized that such a membership property may be defined using any of numerous other ways. As one example, a database query language other than SQL may be used to define such a membership property. As another example, the membership property may be defined using a set of variables and a database language may not be needed.

As shown in the illustrative diagram of FIG. 4, scopes may intersect. Thus, a tuple in the relation R may belong to zero, one or two or more scopes. Tuples that do not belong to any scopes may be non-interesting with respect to a preference specification. Thus, for clarity, all subsequent discussion is with respect to tuples that belong to at least one scope.

Definition 2 [Scope Comparator]: Let $R_i$ and $R_j$ be two scopes in R. The scope comparator $f_{i,j}$ is a function that takes a pair of distinct tuples (one is from $R_i$ and the other is from $R_j$), and returns a first value such as 1 (e.g., if the tuple from $R_i$ is preferred), a second value such as −1 (e.g., the tuple from $R_j$ is preferred), or a null value "⊥" (e.g., if there is no preference).

A scope comparator may be used to specify first-order preferences. In some instances, the scope comparator may be user-defined. Though, in other instances, a scope comparator may be defined, automatically, by a computer. Still, in other embodiments a scope comparator may be defined by a combination of manual and automatic techniques.

A generic interface to a scope comparator may accept two tuples and return either an indication of preference of one tuple over the other, or an indication that no preference can be made. Whenever a tuple $t_i$ is preferred to a tuple $t_j$, we say that $t_i$ dominates $t_j$, denoted as $t_i > t_j$.

FIG. 5 shows illustrates 5 different scope comparators defined on the scopes shown in FIG. 4. In FIG. 5, the scope comparators $f_{3,4}$ and $f_{1,5}$ are unconditional (i.e., they produce first-order preferences without testing any conditions beyond the conditions captured by scope definition). On the other hand, the scope comparators $f_{1,2}, f_{5,6}, f_{6,2}$, are conditional (i.e., they produce preference relations conditioned on some logic).

---
Algorithm 1 Score-based Preferences
---

SCORE-PREFS ($t_i$: tuple, $t_j$: tuple, S: scoring function)
1   if $(S(t_i) > S(t_j))$
2      then return 1
3   else if $(S(t_j) > S(t_i))$
4      then return −1
5   else return ⊥

---

Conditional scope comparators allow defining composite preferences that span multiple attributes given in scope definition and/or comparator logic (e.g., $f_{6,2}$ defines a composite preference on Price and Make attributes).

The generality of scope definitions and preference comparators allow encoding different types of preferences, with different semantics. In the following we give templates for encoding different types of preferences using the above-described language constructs.

Template 1 [Score-Based Preferences]. Preferences are defined using a scoring function S, where tuples achieving better scores are preferred. Without loss of generality and without limitation, assume that higher scores are better, then score-based preferences can be specified using the template given by Algorithm 1.

A total order on a scope $R_i$ (which can be the whole relation R) may be encoded by defining a comparator $f_{i,i}$, using the template in Algorithm 1, where $f_{i,i}$ operates on pairs of distinct tuples belonging to $R_i$.

Template 2 [Partial Order Preferences]. For an attribute x, let $P_x$ be a partial order defined on the domain of x. The partial order can be expressed as a set $P_x = \{(v_i > v_j)\}$ for values $v_i$ and $v_j$ in the domain of x, such that $P_x$ is:
   irreflexive (i.e., $(v_i > v_i) \notin P_x$).
   asymmetric i.e., $(v_i > v_j) \in P_x \Rightarrow (v_j > v_i) \notin P_x$).
   transitive (i.e., $\{(v_i > v_j), (v_j > v_k)\} \subseteq P_x \Rightarrow (v_i > v_k) \in P_x$).

Partial order-based preferences may be encoded using the template given by Algorithm 2.

Template 3 [Skyline Preferences]. Given a set of attributes A, a tuple $t_i$ is preferred to tuple $t_j$ if there exists a non-empty subset $X \subseteq A$, where $\forall x \in X: t_i, x$ is preferred to $t_{j,x}$, while for any other attribute $x' \in A-X$, no preference can be made between $t_i, x'$ and $t_j, x'$. Skyline preferences may be encoded as shown in the template given by Algorithm 3.

Template 4 [Conjoint Analysis Preferences]. Given a set of attributes A, conjoint analysis encodes preferences among attribute values in A when taken conjointly. This can be expressed as a function $C_A$ that maps each combination of values in A to a unique rank. The function $C_A$ is partial on the domains of all possible combinations of values in A. Hence, there can be combinations of values in A that are not mapped to ranks under $C_A$. Conjoint analysis preferences based on $C_A$ may be expressed using the template given by Algorithm 4.

The next example is an example for specifying and managing conjoint analysis preferences.

Example 3

Alice's preferences regarding cars may be expressed conjointly over the attribute pairs (Make, Color), and (Make, Price), as shown in FIG. 6. The value in each cell is the rank assigned to each combination of attribute values.

Conjoint analysis may be based on an additive utility model in which ranks, assigned to combinations of attribute values, may be used to derive a utility (part worth) of each attribute value. The objective is that the utility summation of attribute values reconstructs the given ranking. In FIG. 6, for example, 'Honda' is assigned utility value 40, while 'Red' is assigned utility value 50. Hence, the score of 'Honda,

| Algorithm 3 Skyline Preferences |
|---|
| SKYLINE-PREFS ($t_i$: tuple, $t_j$: tuple, A: subset of attributes) |
| 1   $p_i \leftarrow 0$ |
| 2   $p_j \leftarrow 0$ |
| 3   for all $x \in A$ |
| 4   do |
| 5       if ($t_i, x$ is preferred to $t_j, x$) |
| 6           then $p_i \leftarrow p_i + 1$ |
| 7       else if ($t_j, x$ is preferred to $t_i, x$) |
| 8           then $p_j \leftarrow p_j + 1$ |
| 9       if ($p_i > 0$ AND $p_j > 0$) |
| 10          then return $\perp$ |
| 11  if ($p_i > 0$) |
| 12      then return 1 |
| 13  else if ($p_j > 0$) |
| 14      then return $-1$ |

III. Specifying Second-Order Preferences

Our main language construct for defining second-order preferences is a preferences order (POrder), defined as follows:

Definition 3 [POrder]: given a set of scope comparators J, a POrder is a permutation of comparators in F A POrder represents an ordering of scope comparators based on their relative importance. A POrder may quantify the strength of different first-order preferences based on the semantics of second-order preferences, as discussed in greater detail below in Section IV.

Definition 4 [POrder Projection]: Let A be a POrder defined on the set of comparators F For $F' \subset F$ we denote with ($\Pi_{F'}$ A) a total order of comparators in ordered F' according to A. It follows that $\Pi_F$ A=A.

| Algorithm 4 Conjoint Analysis Preferences |
|---|
| CONJOINT ANALYSIS-PREFS ($t_i$: tuple, $t_j$: tuple, A: subset of attributes, $C_A$: conjoint analysis map) |
| 1   if ($C_A(\{t_i, x : x \in A\})$ is undefined OR $C_A(\{t_j, x : x \in A\})$ is undefined) |
| 2       then return $\perp$ |
| 3   else if ($C_A(\{t_i, x : x \in A\}) < C_A(\{t_j, x : x \in A\})$) |
| 4       then return 1 |
| 5   else return $-1$ |

Red' is 90, which matches the assigned rank 1 in the given Make-Color preferences. Utility values may be computed using regression. For instance, they may be computed using linear regression. Note the mapping between combinations of attribute values and ranks is modeled.

| Algorithm 2 Partial Order Preferences |
|---|
| PARTIAL ORDER-PREFS ($t_i$: tuple, $t_j$: tuple, $P_x$: partial order on attribute x) |
| 1   if (($t_i, x > t_j, x) \in P_x$) |
| 2       then return 1 |
| 3   else if (($t_j, x > t_i, x) \in P_x$) |
| 4       then return $-1$ |
| 5   else return $\perp$ |

For example, for the POrder A=⟨$f_1, f_2, f_3$⟩, and the subset of comparators F'={$f_1, f_3$}, we have $\Pi_{F'}$ A=⟨$f_1, f_3$⟩.

Given a POrder projection A', we say that ($t_i > t_j$) under A' if for a scope comparator $f_a \in A'$, we have $f_a(t_i, t_j)=1$, and there is no other scope comparator $f_b \in A'$, where $f_b > f_a$ according to A', and $f_b(t_i, t_j)=-1$.

Different types second-order preferences may be encoded using POrders.

Prioritized Preference Composition. In this case, second-order preferences are defined as a total order of comparators O=($f_1 > f_2 > \ldots > f_m$), which expresses the requirement that the first-order preferences corresponding to $f_i$ are more important than the first-order preferences corresponding to $f_{i+1}$. Prioritized composition of preferences is formulated as a single POrder with the same comparators order given by O.

Figure 7:
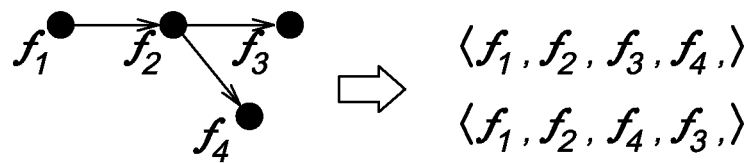
FIG. 7 is a diagram of an illustrative mapping of a partial order to linear extensions, in accordance with some embodiments of the present invention.

Partially Ordered Preferences. A partial order PO on the set of scope comparators may encode partial information on the relative importance of different scope comparators. Let Ω be a set of comparator orderings consistent with PO, where an ordering ω is consistent with PO if the relative order of any two scope comparators in ω does not contradict with PO. The set Ω is called the set of linear extensions of PO. For example, FIG. 7 shows a partial order defined on four comparators and the corresponding set of linear extensions. The set of linear extensions may be obtained using a simple recursive algorithm on the PO graph. Partially ordered preferences may be formulated as the set of POrders given by Ω.

Pairwise Preferences: A set PW={($f_i$>$f_j$)} of pairwise second-order preferences on scope comparators. The pairwise second-order preference ($f_i$>$f_j$) expresses the requirement that the first-order preferences corresponding to $f_i$ are more important than the first-order preferences corresponding to $f_j$. Pairwise second-order preferences PW may be formulated as the set of POrders { ⟨ $f_i$, $f_j$ ⟩ :($f_i$>$f_j$)∈PW.

Pareto Preference Composition: The importance of all scope comparators is equal. The first-order preference ($t_i$>$t_j$) is produced if and only if at least one scope comparator states that ($t_i$>$t_j$), and no other scope comparator states that ($t_j$>$t_i$). Pareto preference composition is formulated as a set of singleton POrders, where each POrder is composed of a single comparator.

Preferences Aggregation: The scope comparators act as voters on preference relations. The first-order preference ($t_i$>$t_j$) is produced if and only if at least one scope comparator states that ($t_i$>$t_j$). Preferences aggregation may be formulated as a set of singleton POrders, where each POrder may be composed of a single comparator.

IV. Constructing a Preference Graph

Given a set of scopes and scope comparators, a graph-based representation of the preferences, termed a preference graph, may be obtained. In this Section, techniques for constructing the given set of scope and scope comparators (first-order preferences) are described. A preference graph may be defined as follows:

Definition 5 [Preference Graph]: A directed graph (V, E), where V is the set of tuples in R and an edge $e_{i,j}$∈E connects tuple $t_i$ to tuple tj if there exists at least one comparator applicable to ($t_i$, $t_j$) and returning 1, or applicable to ($t_j$, $t_i$) and returning −1. The label of edge $e_{i,j}$, denoted $l(e_{i,j})$ is the set of comparators inducing preference of $t_i$ over $t_j$.

One technique for constructing a preference graph is described in Algorithm 5. That algorithm constructs the set of vertices also termed nodes of the preference graph using the union of tuples involved in all input scopes. In other words, each node in the preference graph is associated with a tuple. Accordingly, each node in the preference graph may represent an item. For each pair of distinct tuples, the set of applicable scope comparators may be found and used to compute graph edges and their labels. Accordingly, an edge in the preference graph may correspond to a first-order preference, which may indicate a user preference for one of the two items represented by the nodes terminating the edge.

Edges of the preference graph may be directed edges and may be directed to the node associated with a preferred data item as indicated by the first-order preference associated with the edge. Though, in some embodiments, edges may be undirected and an indication of which of nodes terminating the edge is preferred may be provided differently. For instance, such an indication may be provided by using a signed weight, with a negative weight indicating a preference for one node and a positive weight indicating a preference for the other node.

Figure 8:
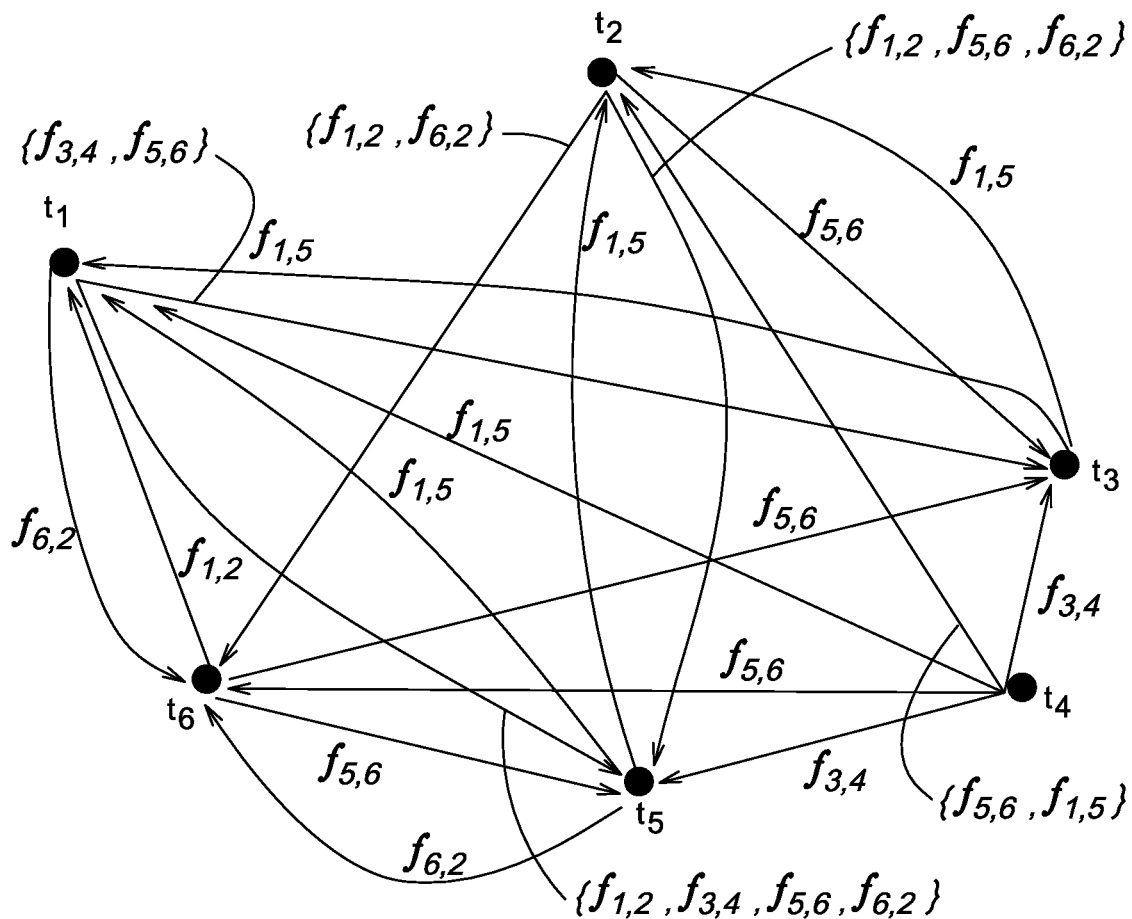
FIG. 8 is a diagram of an illustrative preference graph, in accordance with some embodiments of the present invention.

FIG. 8 illustrates example for the output of the compilation algorithm. In particular, FIG. 8 shows the preference graph obtained from the set of scope comparators {$f_{1,2}$,$f_{3,4}$, $f_{5,6}$,$f_{6,2}$,$f_{1,5}$} described with reference to FIG. 4. Each edge is labeled with a set of supporting comparators. For example, for the edge $e_{2,6}$, we have $l(e_{2,6})$={$f_{1,2}$,$f_{6,2}$}, since the tuple $t_2$ is preferred over the tuple $t_6$ according to the scope comparators $f_{1,2}$ and $f_{6,2}$.

Since scopes may intersect and arbitrary scope comparator logic may be allowed, the induced preference graph may be a cyclic graph. For example, in FIG. a $t_1$-$t_6$ cycle exists since $t_1$ is preferred over $t_6$ according to $f_{6,2}$, while $t_6$ is preferred over $t_1$ according to $f_{1,2}$. Construction of a preference graph according to Algorithm 5 does not guarantee transitivity of graph edges. For example, in FIG. 8, the existence of the edges $e_{2,6}$ and $e_{6,1}$ does not imply the existence of the edge $e_{2,1}$.

---

Algorithm 5 Preferences Compilation

COMPILE-PREFS (S: a set of scopes, F: a set of comparators)
1   V ← ∪$_{s∈S}${t : t ∈ $s_i$} {find the union of all scopes}
2   E ← { } {initialize set of graph edges as empty}
3   for all ($t_i$, $t_j$) ∈ (V × V); $t_i$ ≠ $t_j$
4     do
5       for all f ∈ F
6         do
7           if (f is applicable to ($t_i$, $t_j$))
8             then
9               p ← f($t_i$, $t_j$)
10              if (p = 1)
11                then
12                  $e_{i,j}$ ← 1
13                  append f to $l(e_{i,j})$
14                  if ($e_{i,j}$ ∉ E)
15                    then add $e_{i,j}$ to E
16              else if (p = −1)
17                then
18                  $e_{j,i}$ ← 1
19                  append f to $l(e_{j,i})$
20                  if ($e_{j,i}$ ∉ E)
21                    then add $e_{j,i}$ to E
22  return G(V, E) {return Preferences Graph}

---

The computational complexity of constructing and processing a preference graph is quadratic in the number of tuples. There is a tradeoff between a preference graph's expressiveness and the scalability of its implementation. Though in some embodiments, preferences may be highly "selective" and, consequently, the preference graph may be sparse.

Scalability issues due to the size of the preference graph may be addressed in any of numerous ways. One approach is to use distributed processing in a cloud environment, where storing and managing the preference graph is distributed over multiple nodes in the cloud. For example, a ranking algorithm described below in Section V.A may be easily adapted to function in a cloud environment. Other approaches include sacrificing the precision of preference query results by conducting approximate processing, or thresholding managed preferences to prune weak preferences early, to reduce the size of the preference graph.

A preference graph allows heterogeneous user preferences to be encoded using a unified graphical representation. Though, in some embodiments, computing a ranking of query results using such a representation may require additional quantification of preference strength. Preference strength may be quantified based on the semantics of first-order and second-order preferences, while preserving the preference information encoded by the preference graph. Preference strength may be represented by weights on edges of the preference graph.

Given a preference graph G(V,E), the set of graph edges E may represent pairwise first-order preferences. Specifically, an edge $e_{i,j}$ may express the preference for tuple $t_i$ over tuple $t_j$ according to one or more scope comparator(s). In some instances, a weight $w_{i,j}$ may be associated with an edge $e_{i,j}$. The weight $w_{i,j}$ may be a weight indicative of a degree of preference for the first node over the second node. Stronger preferences may be indicated by higher weights. In some instances, the weight may be a weight between 0 and 1, inclusive and the sum of the weights $w_{i,j}$ and $w_{j,i}$ may equal 1. Disconnected vertices in the preference graph indicate that their corresponding tuples are indifferent with respect to each other.

In some embodiments, computing the weight may comprise dividing the number of first-order preferences for item A relative to item B by the number of all first-order preferences indicating any preference (either for or not for) item A.

For instance, let F be the set of all scope comparators associated with the preference graph. Let A be the set of POrders of F according to the chosen semantics of second-order preferences. Let $F_{i,j}=l(e_{i,j}) \cup l(e_{j,i})$. That is, $F_{i,j}$ is the set of scope comparators that state a preference relationship between tuples $t_i$ and $t_j$. Let $A_{i,j}$ be the multiset of nonempty projections of POrders in A based on $F_{i,j}$. Let $A_{i,j}^+ \subseteq A_{i,j}$ be the set of POrder projections under which $t_i > t_j$, and similarly let $A_{i,j}^- \subseteq A_{i,j}$ be the set of POrder projections under which $t_j > t_i$. It follows that $A_{i,j} = A_{i,j}^+ \cup A_{i,j}^-$, and that $A_{i,j}^+ \cap A_{i,j}^-$ is empty. The weight $w_{i,j}$ may be computed as follows:

$$w_{i,j} = \frac{|A_{i,j}^+|}{|A_{i,j}|}. \quad (1)$$

That is, $w_{i,j}$ corresponds the proportion of POrder projections, under which $t_i > t_j$, among the set of POrder projections computed based on comparators relevant to the edge $(t_i,t_j)$. The weight $w_{j,i}$ may be similarly defined using the set $A_{i,j}^-$. It follows that $w_{i,j}+w_{j,i}=1$. For the case of Pareto composition, at most one of the two edges $e_{i,j}$ and $e_{j,i}$ can exist in the preference graph, since otherwise $t_i$ and $t_j$ would be incomparable. Hence, under Pareto composition, we remove any graph edge $e_{i,j}$ whenever an edge $e_{j,i}$ exists.

We next give an example illustrating how to compute preference weights under different semantics of second-order preferences.

Example 4

Figure 9:
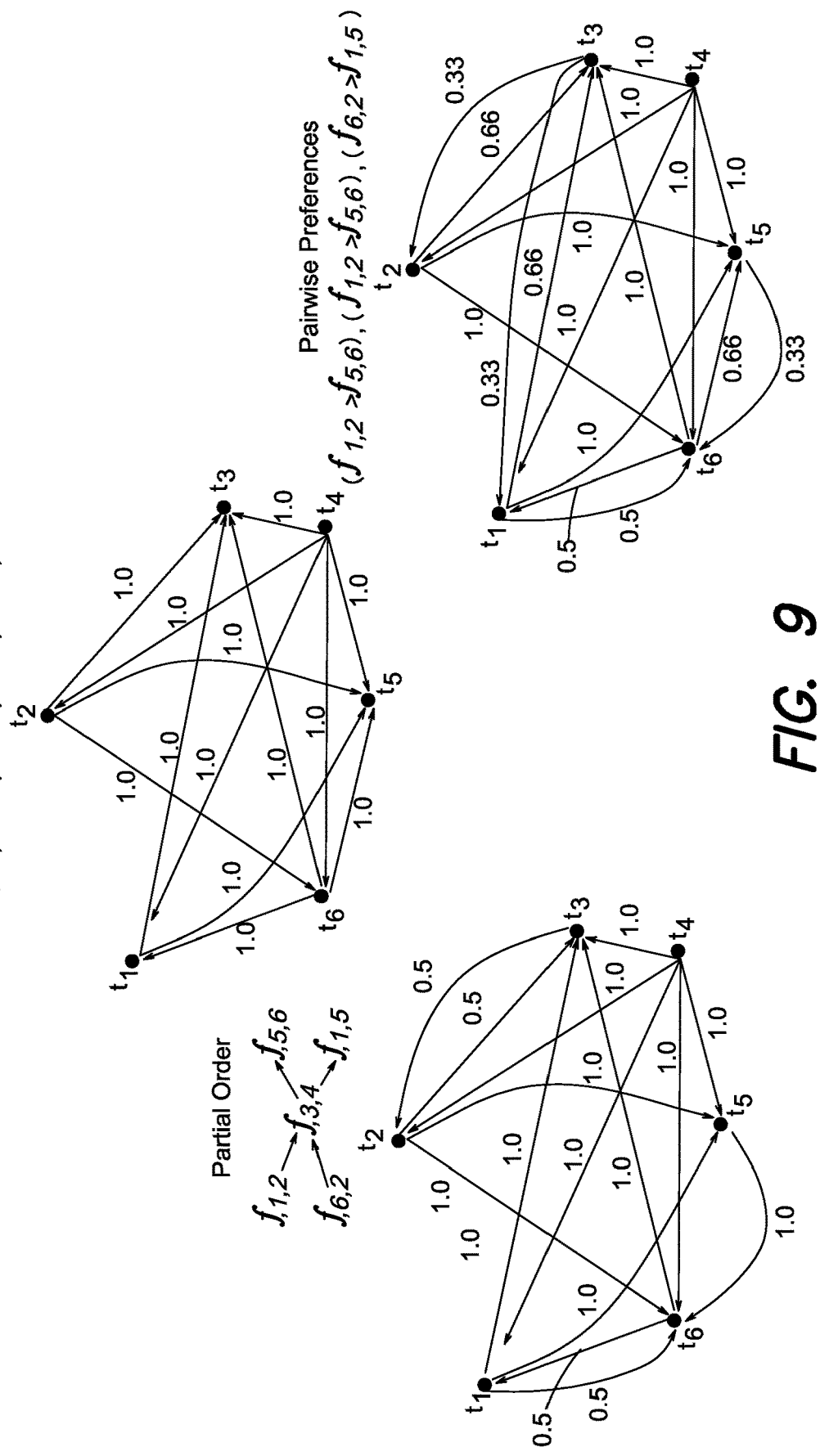
FIG. 9 is a diagram of an illustrative computation of edge weights for different types of second-order preferences, in accordance with some embodiments of the present invention.

FIG. 9 shows three weighted preference graphs, corresponding to the preference graph in FIG. 8, produced under different semantics of second-order preferences. The different semantics of second-order preferences result in different edge weights and/or the removal of some edges in the original preference graph:

Under prioritized comparators, $e_{1,6}$ is removed since, based on the shown comparator priorities, it may be determined that $(t_6 > t_1)$.

Under partially-ordered comparators, we have that $w_{23}=w_{32}=0.5$, since for the relevant $(t_2,t_3)$ set of comparators is $\{f_{5,6}, f_{1,5}\}$ and the given partial order induces four POrder projections $\{\langle f_{1,5},f_{5,6}\rangle, \langle f_{1,5},f_{5,6}\rangle, \langle f_{5,6},f_{1,5}\rangle, \langle f_{5,6},f_{1,5}\rangle\}$, where $(t_2 > t_3)$ under the two POrder projections $\langle f_{5,6},f_{1,5}\rangle, \langle f_{1,5},f_{5,6}\rangle$, while $(t_3 > t_2)$ under the other two POrder projections $\langle f_{1,5},f_{5,6}\rangle$, $\langle f_{1,5},f_{5,6}\rangle$.

Under pairwise preferences, $w_{5,6}=0.33$ since $(t_5 > t_6)$ based on $\langle f_{6,2}\rangle$, which is one out of three POrder projections $\{\langle f_{5,6}\rangle, \langle f_{6,2}\rangle, \langle f_{5,6}\rangle\}$.

V. Ranking

The graph-based preference model described in Section IV may be used to obtain a ranking (a total order) of items in a set of items. This may be done in any of numerous ways. One approach described in Section V.A obtains a ranking-based on authority-based ranking algorithms. Another approach described in Section V.B is a probabilistic algorithm based on inducing a set of complete directed graphs called tournaments from the graph-based preference model and computing a ranking for at least one tournament from the set.

A. Importance Flow Ranking

A total order of items (or, equivalently, tuples representing these items) may be obtained by estimating an importance measure for each tuple using the preference weights encoded by the weighted preference graph. Techniques related to the PageRank importance flow model may be used to compute such importance measures. Under the PageRank model, scores may be assigned to Web pages based on the frequency with which they are visited by a random surfer. Pages are then ranked according to these scores. Intuitively, pages pointed to by many important pages are also important.

The PageRank importance flow model lends itself naturally to problems that require computing a ranking based on binary relationships among items. In the context of preferences, the model may be applied based on the notion that an item may be important if it is preferred over many other important items.

Let G=(V E) be a dominance graph (i.e., a directed graph in which an edge $e_{i,j}$ means $v_i > v_j$), and let L(v) and U(v) be the set of nodes dominated by and dominating v, respectively. Let $\alpha \in [0, 1]$ be a real number called a damping factor. The PageRank algorithm, as known in the art, computes the PageRank score of node $v_i$, denoted $\gamma_i$, according to:

$$\gamma_i = \frac{1-\alpha}{|V|} + \alpha \sum_{v_j \in L(v_i)} \frac{\gamma_j}{|U(v_j)|} \quad (2)$$

The PageRank score of a node v is determined by summing PageRank scores of all nodes v' dominated by v, normalized by the number of nodes dominating v'. It is well known that when $\Sigma_{v_i \in V} \gamma_i = 1$, Equation 2 corresponds to a stationary distribution of a Markov chain, and that a unique stationary distribution exists if the chain is irreducible (i.e., the dominance graph is strongly connected), and aperiodic. Nodes that have no incoming edges (i.e., nodes that are not dominated by any other nodes) lead to sinks in the Markov chain, which makes the chain irreducible. This problem may be handled by adding self-loops at sink nodes, or (uniform) transitions from sink states to all other states in the Markov chain. The damping factor $\alpha$ captures the requirement that each node is reachable from every other node. The value of $\alpha$ is the probability that we stop following the graph edges, and start the Markov chain from a new random node. This may help to avoid being trapped in cycles between nodes that have no edges to the rest of the graph.

Accordingly, in some embodiments a pagerank-based algorithm may be used to calculate a total order of items from the weighted preference graph. Herein, a pagerank-based algorithm refers to any algorithm based on calculating a value from a graph based on characteristics of a Markov chain defined with respect to the graph. Note that a difference between the above described weighted preference graph and the graphs that the PageRank algorithm to which is conventionally applied is that the weighted preference graph has preference weights associated to edges. The preference weights bias the probability of transition (flow) from one state to another, according to weight value, in contrast to the conventional case in which transitions are uniformly defined.

A pagerank-based algorithm may proceed as follows. Given a starting tuple $t_0$ (node) in the weighted preference graph, assume a random surfer that jumps to a next tuple $t_1$, among the set of tuples dominating $t_0$, biased by the edge weights. Intuitively, this corresponds to a process where a tuple is constantly replaced by a more desired tuple (with respect to given preferences). Note that visiting tuples takes place in the opposite direction of edges (jumps are from a dominated tuple to a dominating tuple). Hence, it follows that tuples that are visited more frequently, according to this process, are more likely to be desirable than tuples that are visited less frequently. Ranking tuples based on their visit frequency (pagerank-based scores) defines an ordering that corresponds to their global desirability.

The weighted preference graph may be represented using a square matrix M, where each tuple may corresponds to one row and one column in M. Let $E_j$ be the set of incoming edges to tuple $t_j$ in the weighted preference graph. The entry M [i, j] may be computed as follows:

$$M[i, j] = \frac{w_{i,j}}{\sum_{e_{k,j} \in E_j} \omega_{k,j}} \quad (3)$$

Hence, the sum of all entries in each column in M is 1.0 unless the tuple corresponding to that column has no incoming edges. Matrices in which all the entries are nonnegative and the sum of the entries in every column is 1.0 are called column stochastic matrices. A stochastic matrix defines a Markov chain whose stationary distribution is the set of importance measures we need for ranking. In order to maintain the irreducibility of the chain, we need to eliminate sinks (nodes with no incoming edges in the preference graph). We handle the problem of sinks by adding a self-loop, with weight 1.0, at each sink node.

Let $\Gamma$ be the pagerank scores vector. Then, based on the previous matrix representation, the pagerank scores are given by solving the equation $\Gamma = M \cdot \Gamma$, which is the same as finding the eigenvector of M corresponding to eigenvalue 1. The solution that has been used in practice for computing pagerank scores is using the iterative power method, where r is computed by first choosing an initial vector $\Gamma^0$, and then producing a next vector $\Gamma^1 = M \cdot \Gamma^0$. The process is repeated to generate a vector $\Gamma^T$, at iteration T, using the vector $\Gamma^{T-1}$, generated at iteration T−1. For convergence, at each iteration T, entries in $\Gamma^T$ are normalized so that they sum to 1.0. In practice, the number of iterations needed for the power method to converge may be any suitable of iterations. For instance, tens or hundreds of iterations may be used.

FIG. 10 illustrates the pagerank matrix for the weighted preference graph with prioritized comparators illustrated in FIG. 9. Note that $t_4$ is a sink node with no incoming edges (i.e., $t_4$ has no other dominating tuples). Hence, we add a self-loop with weight 1.0 to $t_4$, represented by the matrix entry M[4, 4]. A typical value of the damping factor a may be a value such as 0.15, but may be any value between 0 and 0.5.

B. Probabilistic Ranking

A total order of items (or top-ranked items) may be obtained from a complete directed graph derived from the preference model. Computing a total order of items from a complete directed graph (also known as a tournament) is termed finding a tournament solution. This problem may be stated as follows. Given an irreflexive, asymmetric, and complete binary relation over a set, find the set of maximal elements of this set. Example methods for finding tournament solutions are computing Kendall scores, and finding a Condorcet winner.

It should be appreciated, however, that the preference graph described in Section IV is not necessarily a tournament. In particular, the preference graph may be symmetric and incomplete:

Symmetry: both edges $e_{i,j}$ and $e_{j,i}$ may exist in the preference graph,
Incompleteness: both edges $e_{i,j}$ and $e_{j,i}$ may be missing from the preference graph.

The symmetry problem implies that some pairwise preferences may go either way with possibly different weights, while incompleteness implies that some pairwise preferences may be unknown.

In some embodiments, a probabilistic approach to obtaining a ranking from the preference graph may be used. Such an approach may rely on deriving one or more tournaments from the preference graph. Each tournament may be associated with a probability. As such, a weighted preference graph may be viewed as a compact representation of a space of possible tournaments, wherein each tournament is obtained by repairing the preference graph to obtain an asymmetric and complete digraph. In order to construct a tournament, two repair operations may be applied to the preference graph:

Remove an edge. Applying this operation eliminates a 2-length cycle by removing one of the involved edges.
Add an edge. Applying this operation augments the graph by adding a missing edge.

As discussed earlier, the value of the weight $w_{i,j}$ represents the probability of selecting a POrder, among the set of all POrders relevant to $(t_i, t_j)$, under which $(t_i > t_j)$. We thus interpret $w_{i,j}$ as the probability with which tuple $t_i$ is preferred to tuple $t_j$. We further assume the independence of $w_{i,j}$ values of different tuple pairs. For each tuple pair $(t_i, t_j)$, if both $w_{i,j} > 0$ and $w_{j,i} > 0$ (i.e., $t_i$ and $t_j$ are involved in a 2-length cycle), the operation remove edge removes the edge $e_{j,i}$ with probability $w_{j,i}$ and removes the edge $e_{j,i}$ otherwise. Alternatively, if $w_{i,j} = 0$ and $w_{j,i} = 0$ (i.e., $t_i$ and $t_j$ are disconnected vertices), the operation add edge adds one of the edges $e_{i,j}$ or $e_{j,i}$ with the same probability 0.5.

Based on the probabilistic process described above, repairing the weighted Preference graph generates a tournament (irreflexive, asymmetric, and complete digraph) whose probability is given by the product of the probabilities of all remaining graph edges. Let c be the number of 2-length cycles in the Preference graph, and d be the number of disconnected tuple pairs. Then, the number of possible tournaments is $2^{c+d}$.

Figure 11:
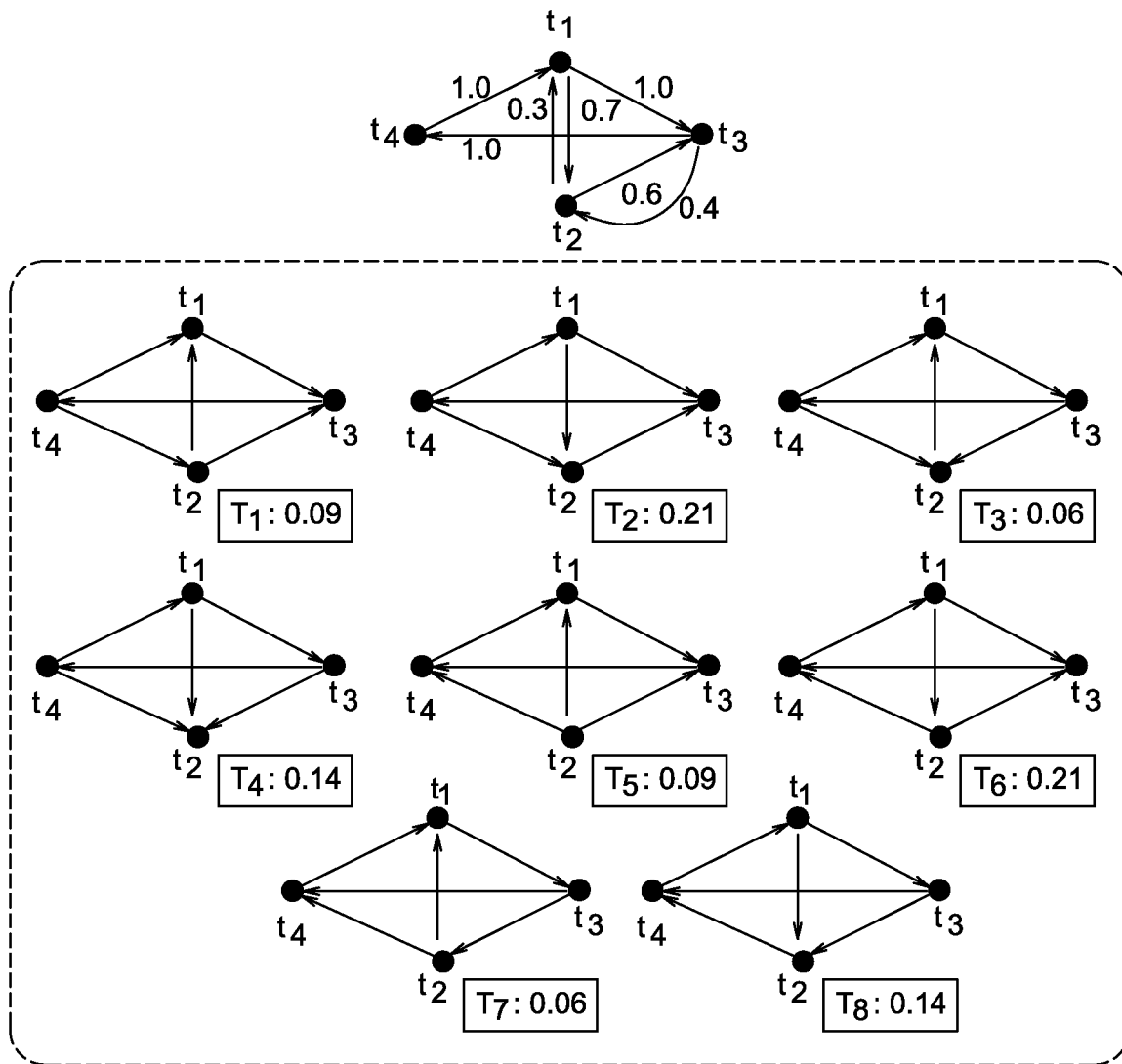
FIG. 11 is a diagram of an illustrative weighted preference graph and tournaments derived from it, in accordance with some embodiments of the present invention.

FIG. 11 illustrates a weighted preference graph, and the corresponding set of possible tournaments $\{T_1, \ldots, T_8\}$. The illustrated preference graph has two 2-length cycles ($t_1$-$t_2$ and $t_2$-$t_3$) and one pair of disconnected tuples ($t_2$, $t_4$), and hence the number of possible tournaments is 8. The probability of each tournament is given by the product of the probabilities associated with its edges. For example, the probability of $T_1$ is 0.09, which is the product of 0.3, 0.6, and 0.5 representing $w_{2,1}$, $w_{2,3}$, and $w_{4,2}$, respectively.

Given a tournament T and a total order of tuples O, we say that O violates T, with respect to the relative order of $(t_i, t_j)$ if $t_i > t_j$ under O, while $t_j > t_i$ under T. The problem of computing a total order of tuples with a minimum number of violations to tournament is known to be NP-hard. Multiple heuristics have been proposed to compute a total order from a tournament. We focus on using Kendall score for computing a total order. The Kendall score of tuple t is the number of tuples dominated by t according to the tournament.

The space of possible tournaments allows computing a total order of tuples under any of numerous probabilistic ranking measures. Two specific measures are described below.

Most probable tournament ranking. Compute a total order of tuples based on the tournament with the highest probability.

Expected ranking. Compute a total order of tuples based on the expected ranking in the space of all the possible tournaments.

Finding the most probable tournament is done by maintaining the edge with the higher weight for each 2-length cycle in the preference graph, and adding an arbitrary edge for each pair of disconnected tuples. According to this method, there may be multiple tournaments with the highest probability among all possible tournaments. The computed total order under any of these tournaments is the required ranking. In the illustrative example of FIG. 11, tournaments $T_2$ and $T_6$ are the most probable tournaments, each with probability 0.21. A total order of tuples in $T_2$ using Kendall scores is $(t_1, t_4, t_2, t_3)$ while a total order of tuples in $T_6$ is $(t_1, t_2, t_3, t_4)$. Let n be the number of tuples in the preference graph, the complexity of the algorithm is $O(n^2)$, since we need to visit all edges of the preference graph.

Finding the expected ranking may be done by computing the expected Kendall score for each tuple using the space of possible tournaments. We model the score of tuple $t_i$ as a random variable $s_i$ whose distribution is given by the space of possible tournaments. In the illustrative example of FIG. 11, $t_1$ dominates one tuple in $\{T_1, T_3, T_5, T_7\}$ with probability summation 0.3, while $t_1$ dominates two tuples in $\{T_2, T_4, T_6, T_8\}$ with probability summation 0.7. Hence, the random variable $s_i$ may take the value 1 with probability 0.3, and takes the value 2 with probability 0.7. The expected value of $s_i$ is thus $1*0.3+2*0.7=1.7$.

Computing the exact expected score of each tuple requires materializing the space of possible tournaments, which is infeasible due to the exponential number of possible tournaments. We thus propose a sampling-based algorithm to approximate the expected value of $s_i$ of each tuple and then rank tuples based on their estimated expected scores. Let $L(t_i)$ be the set of tuples dominated by $t_i$ in the weighted preference graph.

For a tuple $t_1$, a sample Z is generated by adding $t_j \in L(t_i)$ each tuple to Z with probability $w_{ij}$. All samples may be generated independently. Hence, a score sample from $s_i$ distribution is given by |Z|. The expected value of $s_i$ is estimated as the mean of the generated score samples. It is well known that sample mean, computed from a sufficiently large set of independent samples, is an unbiased estimate of the true distribution mean. Let n be the number of tuples in the preference graph, and m be the number of drawn samples for each tuple, the complexity of the algorithm is $O((nm)_2)$, since we access the dominated set of each tuple m times to generate m score samples.

VI. Obtaining User Preferences

An information retrieval system may obtain user preferences in various ways. In some embodiments, the information retrieval system may interact with one or more users to obtain user preferences. The system may interact with the user(s) to obtain first-order preferences and/or second-order preferences and may interact with the user(s) in any suitable way to obtain these preferences. As such, the system may present any suitable information or interface to the user(s) to assist the user(s) in specifying preferences. Though, in some embodiments, the information retrieval system may obtain some, or even all, user preferences without interacting with the user and, for example, may simply receive user preferences from another source and/or utilize user preferences previously obtained by the system or determined "passively," or implicitly, as by observing user behavior.

Figure 12:
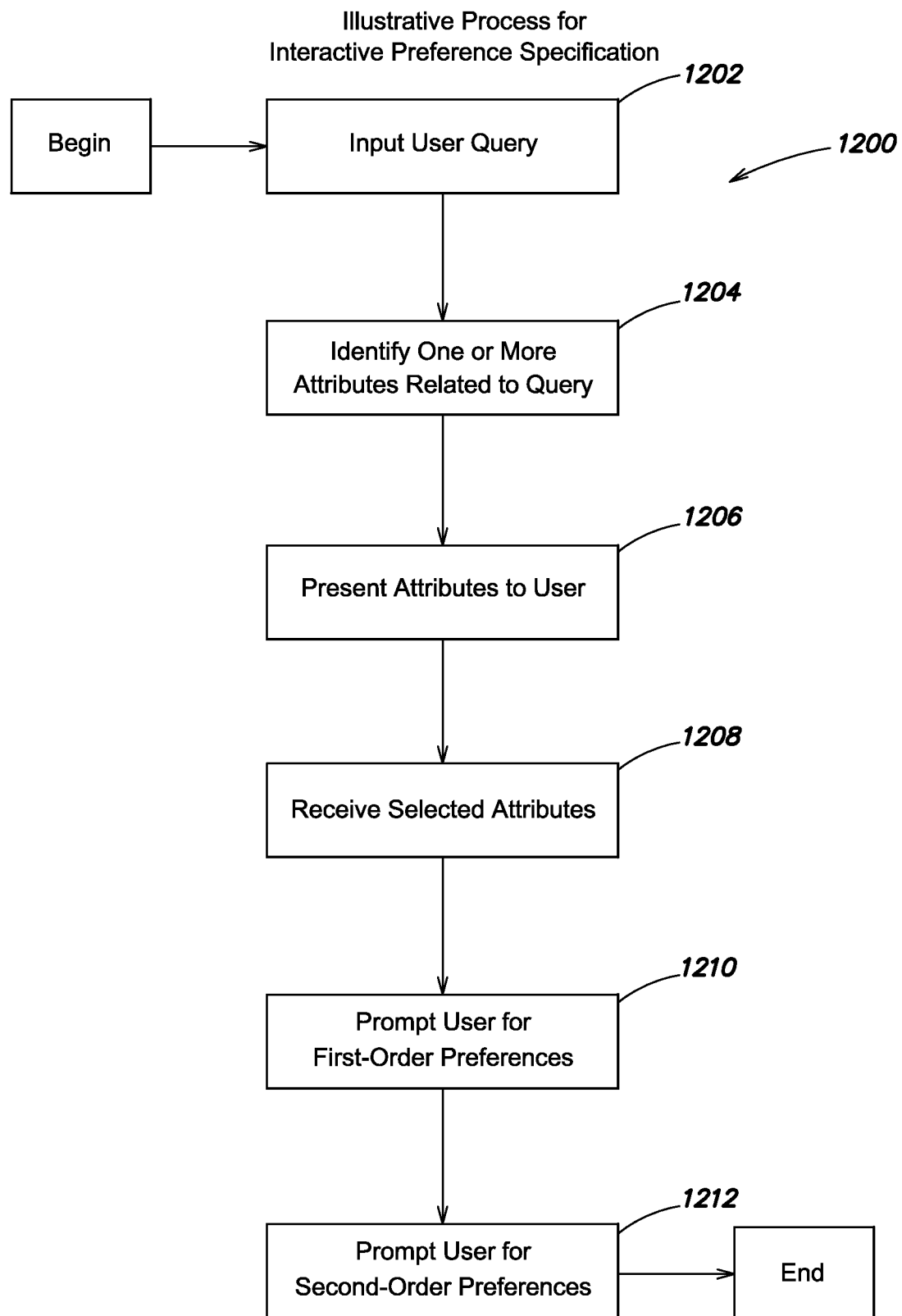
FIG. 12 is a flowchart for an illustrative process for interactively specifying user preferences, in accordance with some embodiments of the present invention.

FIG. 12 shows a flowchart of an illustrative process 1200 for obtaining user preferences. Process 1200 begins in act 1202, where user context information is obtained. User context information may comprise any information that may be used to identify what information the user may be seeking and/or may be interested in. As such, user context information may include, but is not limited to, any suitable information related to the user that may be collected from any available sources and/or any suitable information directly provided by the user.

In some embodiments, information related to a user may be any suitable information about the user. For example, information related to a user may comprise demographic information (e.g., gender, age group, education level, etc.) associated with the user. As another example, information related to a user may comprise details of the user's Internet browsing history. Such information may comprise a list of one or more websites that the user may have browsed, the time of any such browsing, and/or the place (i.e., geographic location) from where any such browsing occurred. The user's browsing history may further comprise information that the user searched for and any associated browsing information including, but not limited to, the search results the user obtained in response to any such searches.

As another example, information related to a user may comprise any information that the user has provided via any user interface on the user's computing device or on one or more websites that the user may have browsed. For instance, information related to a user may comprise any information associated with the user on any website such as a social networking website, job posting website, a blog, a discussion thread, etc. Such information may include, but is not limited to, the user's profile on the website, any information associated with multimedia (e.g., images, videos, etc.) corresponding to the user's profile, and any other information entered by the user on the website.

In some embodiments, information related to a user may comprise geo-spatial information. For instance, the geo-spatial information may comprise the current location of the user and/or a computing device of the user (e.g., user's home, library in user's hometown, user's work place, a place to which the user has traveled, and/or the geographical location of the user's device as determined by the user's Internet IP address, etc.). Geo-spatial information may include an association between information about the location of the user's computing device and any content that the user was searching or viewing when the user's computing device was at or near that location. In some embodiments, information related to a user may comprise temporal information. For example, the temporal information may comprise the time during which a user was querying or viewing specific content on a computing device. The time may be specified at any suitable scale such as on the scale of years, seasons, months, weeks, days, hours, minutes, seconds, etc.

Additionally or alternatively, user context information associated with one or more users may comprise information provided by the user. Such information may be any suitable information indicative of what information the user may be interested in. For example, user context information may comprise one or more user search queries input by a user into a search engine (e.g., an Internet search engine, a search engine adapted for searching a particular domain such as a corporate intranet, etc.). A search query may comprise one or more keywords. For instance, the search query may be a query containing the keyword "car" and may indicate that a user may be interested in looking at items related to cars. As another example, the user may input a query "television" into an Internet search engine, which may indicate that a user may be interested in looking at any webpages containing information about television.

As another example, user context information may comprise one or more user-specified indicators of the type of information the user may be interested in. A user may provide the indicator(s) in any of numerous ways. The user may type in or speak an indication of his preferences, select one or more options provided by a website or an application (e.g., select an item from a dropdown menu, check a box, etc.), highlight or otherwise select a portion of the content of interest to the user on a website or in an application, and/or in any other suitable manner. For example, the user may select one or more options on a website to indicate that he wishes to receive news updates related to a certain topic or topics, advertisements relating to one or more types of product(s), information about updates on any of numerous types of websites, newsletters, e-mail digests, etc.

In act 1202, the user context information may be obtained in any of a variety of possible ways. For example, in some embodiments, the user context information may be provided from a user's client computer to one or more server computers that execute software code that performs process 1200. For example, a user may operate a client computer that executes an application program. The application program may send user context information (e.g., a search query entered by the user into application program to a server computer, which may be a computer that performs process 1200. Thus, the server may receive user context information from an application program executing on a client computer. Such an application program may be any of a variety of types of application programs that are capable of, directly or indirectly, sending information to and receiving information from a server. For example, in some embodiments, the application program may be an Internet or WWW browser, an instant messaging client, or any other suitable application. Though, it should be recognized that receiving user context information from a user's client computer is not a limiting aspect of the present invention as user context information may be obtained in any other suitable way as part of act 1202 of process 1200. For example, user context information may be obtained, actively by requesting and/or passively by receiving, from any source with, or with access to, user context information associated with one or more users.

Next, in act 1204 of process 1200, one or more items in a plurality of items may be identified, based at least in part on the obtained user context information. Furthermore, one or more attributes of the items may be identified as part of act 1204. The items and their attributes may be identified in any suitable way. In some embodiments, items may be identified based on one or more keywords in the user context information. For example, items shown in FIG. 2A may be identified when the user context information comprises the keyword "car." In some embodiments, an attribute may be identified as being a characteristic of a keyword in the user context information. Attributes may be of any suitable type and, for example, may be categorical attributes or numerical attributes. For instance, if the user context information comprised a search query for a "Car," then attributes related to "Car" may be the attributes "Make," "Color," "Price," and any other attributes of car such as the attributes illustrated in FIG. 2A. Items and attributes may be identified automatically by a computer or may be, at least in part, manually specified.

In some embodiments, attributes identified based on received the user context information may be identified at least in part by using a knowledge representation such as a semantic network. Such attributes may be identified if they are related to one or more entities (e.g., concepts) in the knowledge representation. This may be done in any suitable way. For example, if a keyword in the user context information is found to be related to a concept in a semantic network, attributes of that concept may be identified as attributes that are related to the user context information. For instance, if the user context information contained the keyword "Car," then attributes of the concept "Car," which is part of the illustrative semantic network of FIG. 2B, may be identified as attributes that are related to the user context information.

Regardless of the way in which attributes of items are identified, in act 1204, a subset of these attributes may be selected, in acts 1206-1208, so that first- and/or second-order preferences may subsequently be specified for the selected attributes. In some embodiments, the attributes may be selected at least in part by interacting with a user. For example, in the illustrated embodiment, in act 1206, a user may be presented with one or more of the attributes identified in act 1204 of process 1200. This may be done in any suitable way. For example, the user may be shown these attributes visually using a display screen that contains these attributes. The display screen may be any suitable screen containing a representation of the attributes, such as a text representation of the attributes. The user may be prompted to select one or more of the presented attributes. For instance, a user may be presented with a list of previously mentioned attributes associated with the keyword "car" and may select the attributes "Price" and "Color." In act 1208, attributes selected by the user may be received. The user may select one or more attributes in any suitable way by providing any of numerous types of input including, but not limited to, using a mouse click (e.g., to check a checkbox, to click a button, selecting an area of the screen, etc.), dragging an item on the screen, pressing a button on a keyboard, etc. The user's selection is received in act 1208. Though, it should be appreciated that, aspects of the present invention are not limited to selecting attributes by interacting with a user and, in some embodiments, attributes may be selected automatically.

Next, process 1200 proceeds to act 1210, where at least one first-order preference may be obtained. The at least one first-order preference may be obtained based at least in part on input provided by the user. The input may be obtained in any suitable way and, for example, may be obtained by interacting with the user to obtain the input. In some embodiments, the user may be presented with a graphical user interface that enables the user to provide input to specify first-order preferences for each of one or more attributes (e.g., the attributes selected in acts 1208-1210). The graphical user interface may operate to help the user specify first-order preferences for one or more attributes and, for example, may prompt the user to provide input to specify the first-order preferences. The graphical user interface may allow the user to specify first-order preferences of any suitable type. For instance, the user may specify score-based preferences, partial order preferences, skyline preferences, and/or conjoint analysis preferences as discussed with reference to Section II.

The user may be assisted in specifying any of the above-mentioned first-order preferences in any of numerous ways. In some embodiments, a graphical user interface may be used. The graphical user interface may allow the user to graphically represent the first-order preferences (e.g., by drawing preferences). In some embodiments, the user may be provided with a series of prompts designed to obtain information required to specify first-order preferences.

Next, process 1200 proceeds to act 1212, where at least one second-order preference may be obtained. The at least one second-order preference may be obtained based at least in part on input provided by the user. The input may be obtained in any suitable way and, for example may be obtained by interacting with the user to obtain the input. In some embodiments, the user may be presented with a graphical user interface that enables the user to provide input to specify second-order preferences among one or more attributes (e.g., the attributes selected in acts 1208-1210). The graphical user interface may operate to help the user specify second-order preferences for one or more attributes and, for example, may prompt the user to provide input to specify the second-preferences. The graphical user interface may allow the user to specifying second-order preferences of any suitable type. For instance, the user may specify prioritized preference composition preferences, partial order preferences, pairwise preferences, and/or Pareto preference composition preferences as discussed with reference to Section III. After first-order and second-order preferences have been specified, process 1200 completes.

It should be appreciated that the information retrieval system may be configured to ascertain user preferences (e.g., first-order user preferences and/or second-order user preferences) in any suitable way and based on any suitable input provided by the user. For example, as described above, the system may ascertain user preferences in response to a user selection of one or more attributes. The system may be configured to ascertain user preferences based on any of numerous types of user input including, but not limited to, clicks, sliding bars, variable font size, darkness, and proximity of placement of user input to the center of the screen. As another example, the system may be configured to ascertain user preferences based on the user's selection and/or browsing of any content related to an attribute or attributes.

VII. Illustrative Process for Calculating A Ranking For One or More Items

Figure 13:
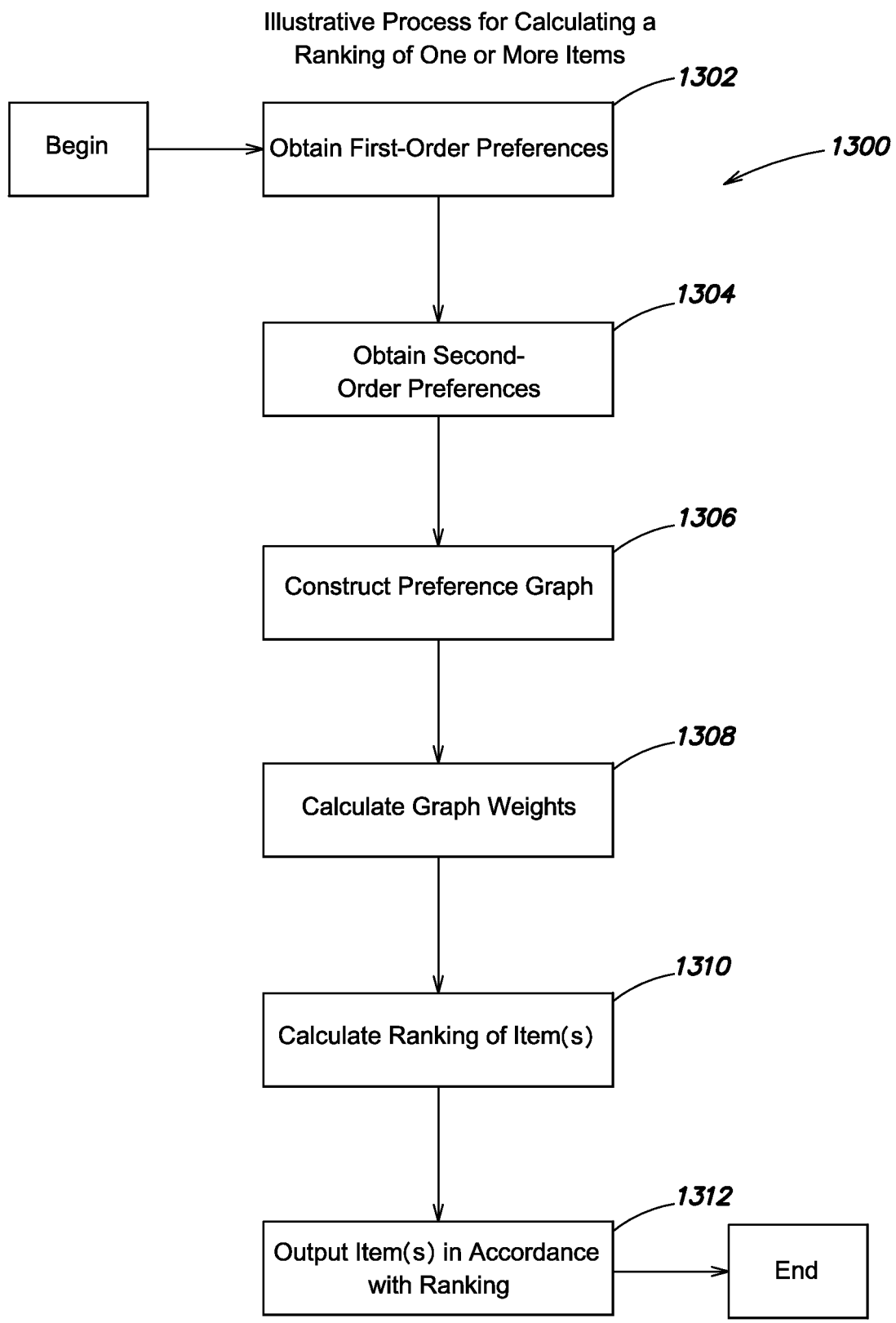
FIG. 13 is a flowchart for an illustrative process for computing a ranking for one or more items based on user preferences, in accordance with some embodiments of the present invention.

It should be appreciated that the above techniques may be implemented as part of a process for calculating a ranking for one or more items in a set of items. Each item may be any of the previously-described types of items including, but not limited to, any item that may be manufactured, sold, and/or purchased, an item comprising information (e.g., content), and one or more entities in a knowledge representation. One such process is illustrated in FIG. 13, which is a flowchart of an illustrative process 1300 for calculating a ranking for one or more items.

Process 1300 begins in act 1302, where first-order-preferences are obtained. The first-order preferences may be obtained in any suitable way. For example, the first-order preferences may be provided by a user or on behalf of a user. In some embodiments, an information retrieval system may interact with the user to help the user specify first-order preferences. This may be done in any of numerous ways and, for example, may be done as previously described in Section VI.

Process 1300 next proceeds to act 1304, where second-order preferences are obtained. The second-order preferences may be obtained in any suitable way. For example, the second-order preferences may be provided by a user or on behalf of a user. In some embodiments, an information retrieval system may interact with the user to help the user specify second-order preferences. This may be done in any of numerous ways and, for example, may be done as previously described in Section VI.

It should be appreciated that, although in the illustrated embodiment second-order preferences are shown as being obtained after first-order preferences are obtained this is not a limitation of some aspects of the present invention. In some embodiments second-order preferences may be obtained before or concurrently with first-order preferences. For instance, in the previously described example of specifying preferences for cars, a user may first specify a second-order preference indicating that price of car is more important to the user than the color of a car. Then, the user may specify that the user prefers items with a lower price (a first-order preference) and/or that the user prefers red cars to yellow cars (another first-order preference).

It should also be appreciated that, in some embodiments, both first-order preferences and second-order preferences need not be specified as aspects of the present invention are not limited in this respect. For example, in some instances, only one or more first-order preferences may be specified. In other instances, only one or more second-order preferences may be specified.

Regardless of the order in which they are obtained, after the first- and second-order preferences are obtained, process 1300 proceeds to act 1306, where a preference model is constructed based at least in part on the obtained preferences. It should be appreciated that the preference model may be constructed from only first-order preferences, only second-order preferences or any suitable combination thereof as aspects of the present invention are not limited in this respect. The preference model may be constructed in any of numerous ways and, for example, may be constructed by using any of the techniques described in Section IV above. The preference model may be a graph-based preference model and the data structure encoding the preference model may encode a preference graph characterizing the graph-based preference model. Accordingly, in act 1306 of process 1300, a preference graph may be constructed based at least in part first- and/or second-order preferences. As previously the preference graph may comprise a set of nodes and a set of edges connecting nodes in the set of nodes. Nodes of the preference graph may be associated with items of any suitable type. For instance, nodes of the graph may be associated with tuples, concepts in one or more knowledge representations, concepts related with one or more keywords in a query, etc. Edges of the preference graph may be associated with one or more first-order preferences for one item over another item.

Next, process 1300 proceeds to act 1308, where one or more weights for the preference graph may be computed. As previously described, a weight may be associated to each of one or more edges in the preference graph in order to provide an indication of a degree of preference for one of the nodes terminating the edge. The weight may be computed based on first-order and/or second-order preferences. The weight may be computed in any of the ways described in Section IV above or in any other suitable way.

Next, process 1300 proceeds to act 1310, where a ranking of one or more items in the set of items may be computed, at least in part, by using the preference graph and any associated weights calculated in acts 1306 and 1308 of process 1300. The graph-based preference model may be used to rank the item(s) in any of numerous ways including, but not limited to, any of the ways previously described in Section V such as by computing a ranking by identifying tournaments in a completed directed graph obtained from the preference graph, applying a Markov-chained based algorithm to the preference graph, etc.

Regardless of how the ranking of one or more items is calculated in act 1310, after the ranking of the item(s) is calculated, process 1300 proceeds to act 1312, where the ranking is used to obtain output to present to one or more users and/or to utilize in any suitable subsequent processing. In some embodiments, at least a subset of items may be identified based on the ranking calculated in act 1310 and output associated with the identified items may be presented to one or more users. The subset of items may be identified based at least in part on the ranking in any of numerous ways. For example, the subset of items may be a subset of top ranking items (e.g., items ranking in the top 1 percent of items, 2 percent of items, 3 percent of items, etc.).

Output associated with the identified items may be presented to one or more users in any suitable way. For example, the presented output may be presented in accordance with the ranking such that the output is ordered based on the ranking. In some embodiments, output associated with an item ranked higher than another item may be shown more prominently that output associated with the other item. For example, output associated with the higher-ranking item may be presented on top of output associated with the other item, may be presented in a different (e.g., larger, boldfaced, italicized, etc.) font than output associated with the other item, may be emphasized more than output associated with the other item, etc.

Output associated with an item may comprise any suitable information about or related to the item. In some embodiments, output associated with an item may comprise one or more values of attributes of the item. For example, in the illustrative example of FIG. 2A, output associated with each car may comprise one or more attribute values (e.g., "price," "color," etc.) of that car. In some embodiments, output associated with an item may comprise information identifying the item. For example, in the illustrative example of FIG. 2A, output associated with each car may comprise an identifier of that car. Though it should be appreciated that these are merely illustrative examples and that output associated with an item may comprise any other suitable information associated with the item. Process 1300 completes after act 1312 is performed.

VIII. Applying Preferences To Knowledge Representations

As previously mentioned, in some embodiments, semantic processing techniques may be used to perform any of numerous types of semantic processing in accordance with user preferences. In these embodiments, user preferences may be specified for one or more concepts in the semantic network and one or more semantic processing acts may be performed by using the specified user preferences and/or the semantic network.

Accordingly, various types of user preferences may be specified for one or more concepts in a semantic network. In particular, preferences for a concept in a semantic network may be specified as first-order preferences and/or second-order preferences. As previously mentioned, first-order preferences for a concept may be expressed by specifying preferences for a concept among children of an attribute of the concept. For example, in the semantic network shown in FIG. 2B, first-order preferences for the concept "car" may be expressed by specifying preferences among children of an attribute (e.g., "Price") of the concept car. When a concept has multiple attributes (e.g., the concept "Car" has multiple attributes including "Price" and "Color"), first-order preferences may include preferences among children of an attribute, for each of the multiple attributes of the concept (e.g., first-order preferences specified for children of the attribute "Price" and first-order preferences specified for children of the attribute "Color").

In addition, as previously mentioned, second-order preferences for a concept may be expressed by specifying preferences among attributes of the concept. For example, in the semantic network shown in FIG. 2B, second-order preferences for the concept "Car" may be expressed by specifying preferences among attributes (e.g., "Price," "Color," "Deposit," etc.) of the concept "Car." Such second-order preferences may be considered to be preferences among first-order preferences, if such first-order preferences were specified for children of the attributes of the concept.

It should be appreciated that, in embodiments where the semantic network represents one or more items using one or more concepts, preferences for the item(s) may be specified by specifying preferences for the concept(s).

It should also be appreciated that user preferences for a concept in a semantic network are not limited to being first- or second-order preferences as described above. Furthermore, preferences for a concept are not limited to being specified based exclusively on descendants of the concept. For example, in some instances, user preferences for a concept may be specified by using any concepts in the semantic network and, for example, may be specified using concepts that are ancestors, siblings, or descendant s of the concept, as aspects of the present invention are not limited in this respect.

Figure 14:
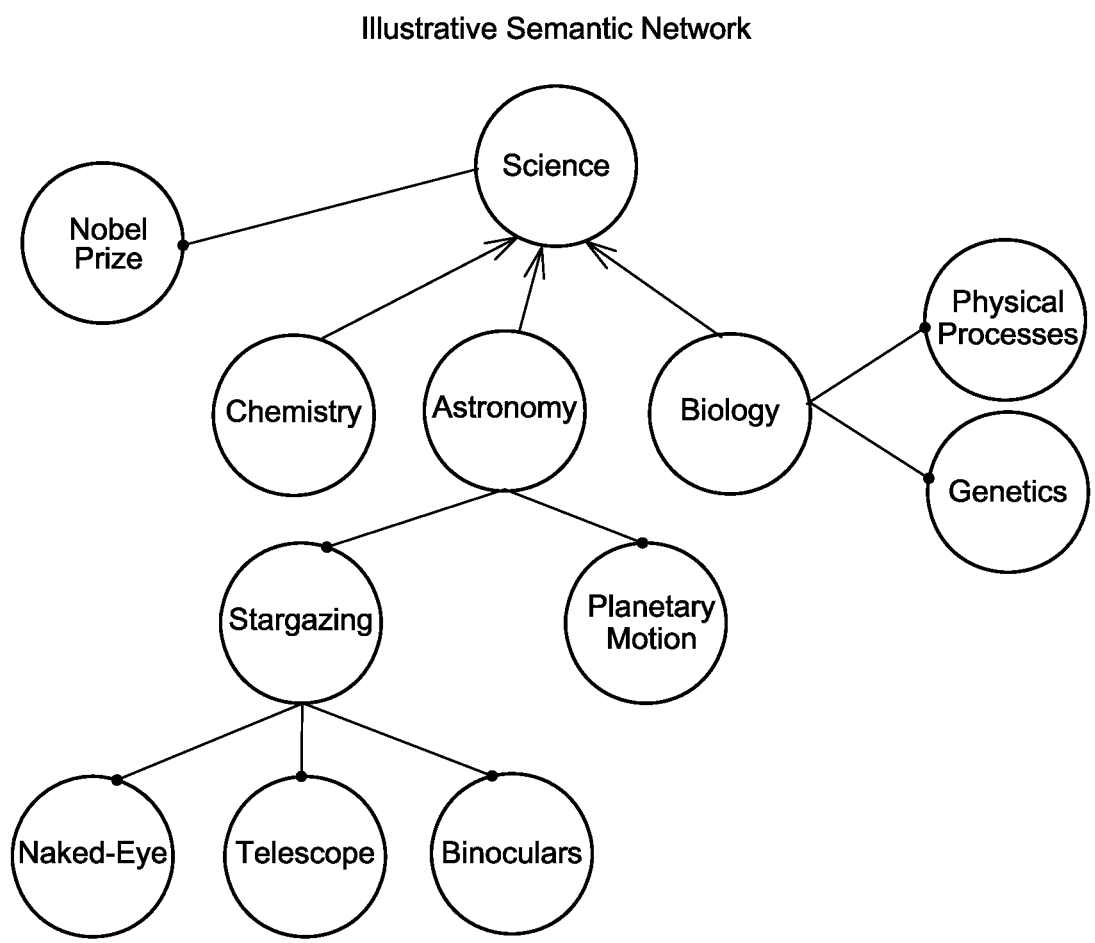
FIG. 14 shows an illustrative example of a knowledge representation, in accordance with some embodiments of the present invention.

It should also be appreciated that a semantic network may comprise multiple concepts for which user preferences may be specified. Indeed, preferences may be specified for one or multiple concepts in a semantic network. For example, first-order preferences may be specified for any concept having at least one attribute with two or more children. As another example, second-order preferences may be specified for any concept having at least two attributes. One example of a semantic network representing multiple concepts is shown in FIG. 14, which shows a semantic network representing concepts relating to the concept "science." User preferences may be specified for multiple concepts in this illustrated semantic network. First-order preferences, for instance, may be specified at least for the concepts "Science" and "Astronomy." Second-order preferences may be specified for the concepts "Science," "Astronomy," "Biology," and "Stargazing."

In some embodiments, any of the types of first- and second-order preferences previously described in Section II and III may be specified for one or more concepts in a semantic network. First-order preferences including, but not limited to, score-based preferences, partial order preferences, skyline preferences, and conjoint analysis preferences may be specified for one or more concepts in a semantic network. Similarly, second-order preferences including, but not limited to, prioritized preference composition, partially ordered preferences, pairwise preferences, Pareto preference composition, and preference aggregation may be specified for one or more concepts in a semantic network.

Regardless of the type of user preferences specified for one or more concepts in a semantic network, once these preferences are specified, they may be used to construct a preference model for one or more items represented by a semantic network. This model may be a graph-based preference model and may be constructed in accordance with the techniques described in Section IV. To this end, a preference graph may be constructed based at least in part on the specified preferences and the concept for which the preferences are specified. Additionally, the preference graph may be constructed based on any other information associated with semantic network. For example, the preference graph may be constructed based at least in part on one or more of the following: the topology of the graph associated with the semantic network, ancestors of the concept for which preferences were specified, siblings of the concept for which preferences were specified, descendants of the concept for which the preferences were specified, one or more weights associated with edges in the graph representing the semantic network, etc. Furthermore, weights may be computed for edges in the preference graph as previously described in Section IV.

Once a preference model for items represented by a knowledge representation is constructed, the specified preferences and/or the constructed preference model may be used to perform any of numerous types of semantic processing. For example, in some embodiments, where a semantic network may represent one or more items in a set of items, performing semantic processing may comprise calculating the ranking of one or more items represented by the semantic network. This may be done at least in part by constructing a preference model based at least in part on the specified user preferences as discussed in greater detail below. As another example, in some embodiments, performing semantic processing may comprise synthesizing one or more new concepts based at least in part on the specified user preferences. As yet another example, in some embodiments, performing semantic processing may comprise calculating the ranking of one or more concepts in the semantic network based at least in part on the specified user preferences. Such a ranking may be used to present concepts in the semantic network to any data consumer, which may be a software application or a human user who may view and/or utilize the semantic network through a software interface.

To better appreciate how user preferences may be used to perform various types of semantic processing, reference will now be made to systems 1600 and 1700 shown in FIGS. 16 and 17, respectively. Some aspects of systems 1600 and 1700 are explained in greater detail in U. S. Application Pub. No. US 2011/0320396, filed Jun. 21, 2011, published Dec. 29, 2011, and titled "Systems and Methods for Analyzing and Synthesizing Complex Knowledge Representations" by Anne Hunt et al., which is hereby incorporated by reference in its entirety. In particular, systems 1600 and 1700 comprise a number of components (e.g., AKRM data set 110, elemental data structure 120, knowledge processing rules 130, input rules 140, analysis engine 150, input KRs 160, synthesis engine 170, context information 180, and data consumer 195) that are described in greater detail in the above-referenced application publication.

Figure 16:
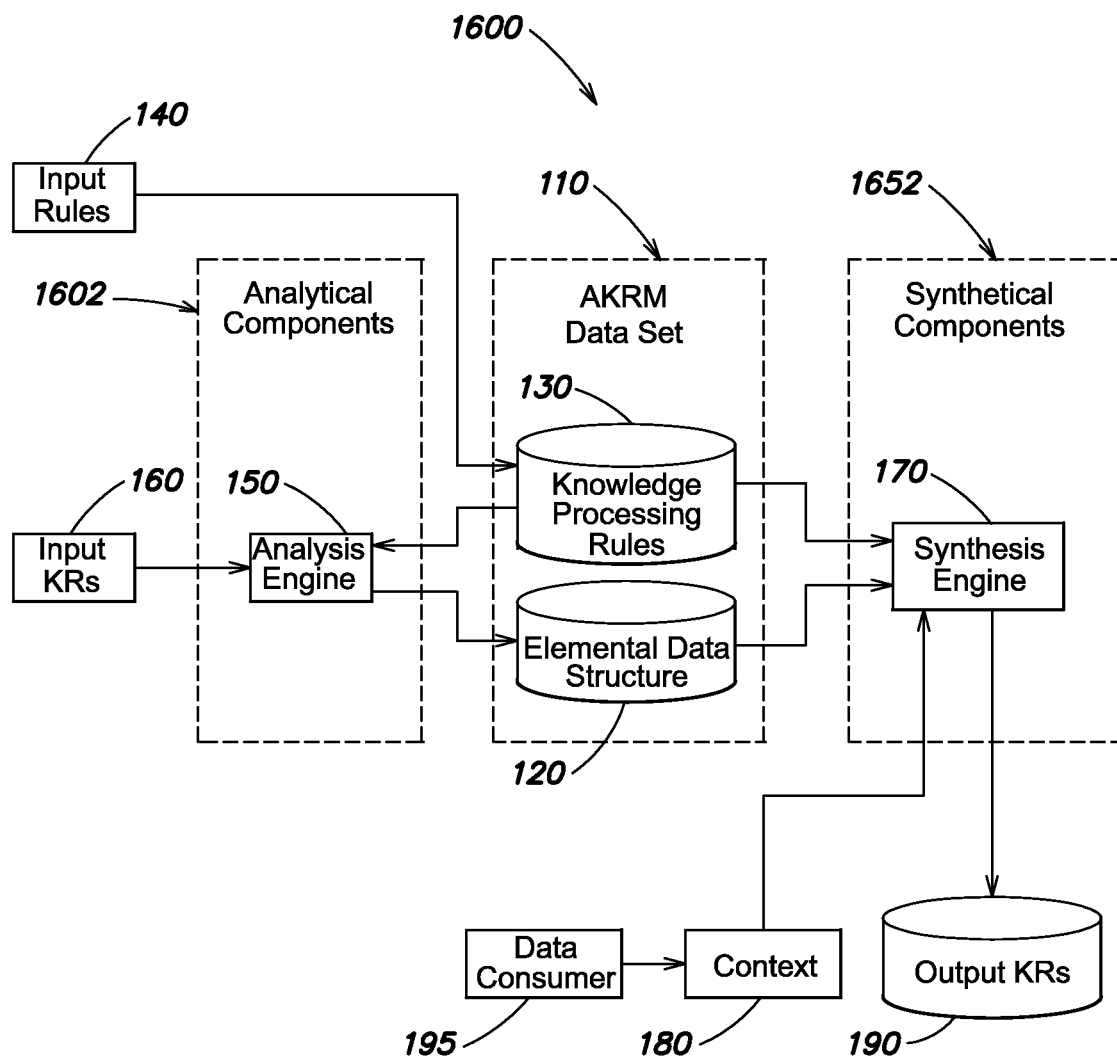
FIG. 16 is a block diagram illustrating an exemplary system for implementing an atomic knowledge representation model in accordance with some embodiments of the present invention.

In an exemplary system such as system 1600 of FIG. 16, embodiments of synthesis engine 170 may synthesize output knowledge representations (KRs), such as semantic networks, by applying knowledge processing rules 130 to elemental data structures 120. Embodiments of synthesis engine 170 may be provided with context information 180 associated with a data consumer 195. In some embodiments, context information 180 may be user context information, which was previously described in Section VII, and as such may include information provided by a user or users. Such information may be, for example, a textual query or request, one or more search terms, identification of one or more active concepts, a request for a particular form of output KR 190, etc. In some embodiments, receipt of context information 180 may be interpreted as a request for an output KR (e.g., an output semantic network), without need for an explicit request for an output KR to accompany the context.

In some embodiments, in response to an input request and/or context information 180, synthesis engine 170 may apply one or more appropriate knowledge processing rules 130 encoded in AKRM data set 110 to elemental data structure 120 to synthesize one or more additional concepts and/or concept relationships not explicitly encoded in elemental data structure 130. The synthesized concept(s) and/or concept relationship(s) may be used to augment a knowledge representation, such as a semantic network. In some embodiments, synthesis engine 170 may apply appropriate knowledge processing rules 130 to appropriate portions of elemental data structure 120 in accordance with the received input request and/or context information 180. For example, if context information 180 specifies a particular type of complex KR to be output, in some embodiments only those knowledge processing rules 130 that apply to synthesizing that type of complex KR may be applied to elemental data structure 120. In some embodiments, if no particular type of complex KR is specified, synthesis engine 170 may synthesize a default type of complex KR, such as a semantic network. In some embodiments, if context information 180 specifies one or more particular active concepts of interest, for example, synthesis engine 170 may select only those portions of elemental data structure 120 related (i.e., connected through concept relationships) to those active concepts, and apply knowledge processing rules 130 to the selected portions to synthesize the output KR. In some embodiments, a predetermined limit on a size and/or complexity of the output complex KR may be set, e.g., by a developer of the exemplary system 1600, for example conditioned on a number of concepts included, hierarchical distance between the active concepts and selected related concepts in the elemental data structure, encoded data size of the resulting output complex KR, processing requirements, relevance, etc.

In some embodiments, an output KR may be encoded in accordance with any specified type of KR indicated in the received input. In some embodiments, the output KR may be provided to data consumer 195. As discussed above, data consumer 195 may be a software application or a human user who may view and/or utilize the output KR through a software user interface, for example.

In some embodiments, a data consumer 195 may provide context information 180 for directing synthesis operations. For example, by inputting context information 180 along with a request for an output KR 190, a data consumer may direct exemplary system 1600 to generate an output KR 190 relevant to context information 180. For example, context information 180 may contain a search term that may be mapped to a concept of interest to data consumer 195. In some embodiments, synthesis engine 170 may, for example, apply knowledge processing rules to those portions of elemental data structure 120 that are more relevant to the concept associated with the context information 180.

Figure 17:
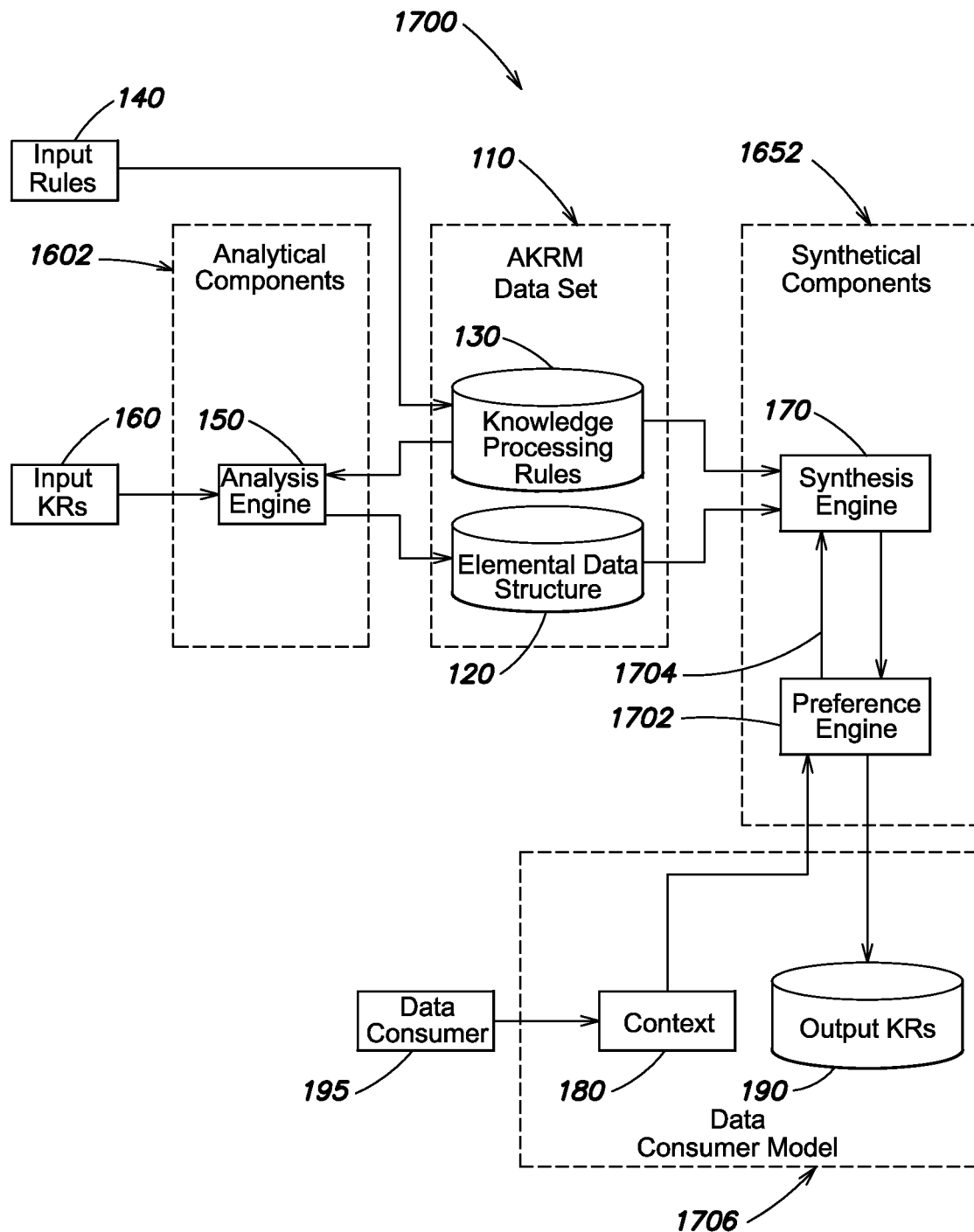
FIG. 17 is a block diagram illustrating another exemplary system for implementing an atomic knowledge representation model in accordance with some embodiments of the present invention.

FIG. 17 illustrates an exemplary system 1700 that may be employed in some embodiments for implementing an atomic knowledge representation model (AKRM) involved in analysis and synthesis of complex knowledge representations (KRs), in accordance with some embodiments of the present invention. In some embodiments, context information 180 may comprise preference information. The preference information may be any of the previously described preference information and, for example, may comprise preferences specified for one or more entities in a knowledge representation. For instance, preference information may comprise preferences specified for one or more concepts in a semantic network. Preferences for a concept in a semantic network may be any of the previously described types of preferences such as first-order preferences or second-order preferences. In some embodiments, such preference information may be represented by a preference model (e.g., a graph-based preference model). In some embodiments, synthesis engine 170 may rely on the preference information and/or preference model when synthesizing KRs and/or presenting KRs to a data consumer.

Some embodiments of exemplary system 1700 may include data consumer model 1706 (or "user model"), which may comprise data related to one or more data consumers that was acquired from one or more information sources. For example, a user model 1706 may comprise one or more output KRs 190 provided by synthesis engine 170. In some embodiments, user model 1706 may comprise data derived from an interaction of a data consumer 195 with an output KR 190. Exemplary interactions of a data consumer 195 with an output KR 190 may include selection, highlighting, or specification by a data consumer 195 of one or more output KRs 190 from a plurality of output KRs presented by synthesis engine 170, or selection, highlighting, or specification by the data consumer 195 of a particular aspect or portion of an output KR 190. Though, a user model 1706 may comprise data derived from any interaction of a data consumer 195 with an output KR 190. Embodiments of exemplary system 1700 are not limited in this respect.

In some embodiments, a user model 1706 may comprise context information 180 or data associated with context information 180. As discussed above, context information 180 may include a textual query or request, one or more search terms, identification of one or more active concepts, etc.

In some embodiments, a data consumer model 1706 may correspond to a data consumer 195. In some embodiments, a data consumer model 1706 corresponding to a data consumer 195 may persist for the duration of the data consumer's session with exemplary system 1700. Some embodiments of a data consumer model 1706 may persist across multiple sessions. A session may begin when a data consumer logs in or connects to exemplary system 1700, and may end when a data consumer logs out or disconnects from exemplary system 1700. Though, the scope of a session may be determined using conventional techniques or any suitable techniques as aspects of the present invention are not limited in this respect.

Some embodiments of exemplary system 1700 may include a preference engine 1702. In some embodiments, synthetical components 1752 may comprise preference engine 1702. In some embodiments, preference engine 1702 may receive context information 180 containing preference information. In some embodiments, the preference information may comprise a preference model. In some embodiments, preference engine 1702 may create a preference model based on the preference information. In some embodiments, preference engine 1702 may provide preference information and/or a preference model to synthesis engine 170. In some embodiments, synthesis engine 170 may rely on the preference information and/or the preference model provided by preference engine 1702 to guide synthesis of a complex KR in accordance with preferences of a data consumer 195. In some embodiments, preference engine 1702 may rely on preference information and/or the preference model to guide presentation of concepts in a complex KR and/or presentation of output KRs in accordance with preferences of a data consumer 195.

In some embodiments, preference engine 1702 may assign a weight or probability to an active concept or to any elemental concept in an elemental data structure, the weight representing a relevance of the concept to a data consumer 195. The preference engine 1702 may calculate the weight assigned to a concept based on context information 180, and/or preference information, and/or the preference model.

Preference engine 1702 may be implemented in accordance with techniques described herein. For example, Some embodiments of preference engine 1702 may allow a data consumer 195 to specify of user preferences for one or more entities in a knowledge representation or one or more items represented by a knowledge representation. In particular, preference engine 1702 may allow a data consumer to specify preferences for one or more concepts in a semantic network and/or one or more items, in a plurality, represented by the semantic network. These preferences may be any of the previously described types of preferences such as first-order preferences and second-order preferences. Preference engine 1702 may be configured to construct a preference model based on the specified preferences. In some embodiments, preference engine 1702 may be configured to construct a graph-based preference model, in accordance with the techniques described in Section IV. In some embodiments, preference engine 1702 may be configured to calculate a rank for one or more concepts in a semantic network and/or one or more items represented by the semantic network, in accordance with techniques described in Section V.

In some embodiments, preference engine 1702 may provide preference information and/or a preference model to synthesis engine 170 to facilitate synthesis of a complex KR in accordance with preferences of a data consumer 195. In some embodiments, a preference model may comprise weighted concepts. In some embodiments, a weighted concept in a preference model may correspond to a concept in an elemental data structure 120.

In some embodiments, a preference model may influence the synthesis process in various ways. For example, in some embodiments, synthesis engine 170 may synthesize more concepts in relation to a concept in the preference model that is more heavily weighted (a "more preferred" concept), while synthesizing fewer concepts in relation to a less heavily weighted concept of the preference model (a "less preferred" concept). Synthesis engine 170 may control a degree of synthesis in relation to a concept in a variety of ways. In some embodiments the synthesis engine 170 may apply more knowledge processing rules in relation to more preferred concepts. In some embodiments, the synthesis engine 170 may use less stringent thresholds when applying a knowledge processing rule in relation to a more preferred concept. For example, synthesis engine 170 may use a lower relevance threshold, coherence threshold, semantic similarity threshold, or synonym threshold when applying a relevance rule, coherence rule, associative relationship rule, or synonym rule.

Furthermore, in some embodiments, synthesis engine 170 may temporally prioritize synthesis in relation to a more preferred concept over synthesis in relation to a less preferred concept. For example, synthesis engine 170 may synthesize concepts in relation to a more preferred concept before synthesizing concepts in relation to a less preferred concept. If synthesis engine 170 is configured to generate at most a certain maximum number of concepts, temporally prioritizing synthesis in this manner ensures that synthesis in relation to less preferred concepts does not occur at the expense of synthesis in relation to more preferred concepts. In some embodiments, synthesis engine 170 may begin synthesizing in relation to a less preferred concept only if the certain maximum number of concepts is not generated by first completing synthesis in relation to more preferred concepts.

Likewise, the synthesis engine 170 may devote more processing resources and/or processing time to synthesizing in relation to a more preferred concept, while devoting less processing resources and/or processing time to synthesizing in relation to a less preferred concept.

Additionally or alternatively, some embodiments of preference engine 1702 may rely on preference information and/or a preference model to guide presentation of an output KR's concepts in accordance with preferences of data consumer 195. In some embodiments, preference information may include a general preference model that may be used to produce a ranking of items and/or concepts in accordance with preferences of data consumer 195. Preference engine 1702 may use such ranking information to impose an ordering on the concepts in an output KR 190.

In other words, in some embodiments an output KR 190 may be presented to a data consumer 195 in a format that is not rank-ordered, such as a graph. In other embodiments, an output KR 190 may be presented to a data consumer 195 in a rank-ordered format, such as a list, with the rankings being assigned based on preference information.

IX. Additional Implementation Detail

The above-described embodiments of the present invention can be implemented in any of numerous ways. For example, the embodiments may be implemented using hardware, software or a combination thereof. When implemented in software, the software code may be embodied as stored program instructions that may be executed on any suitable processor or collection of processors (e.g., a microprocessor or microprocessors), whether provided in a single computer or distributed among multiple computers.

It should be appreciated that a computer may be embodied in any of numerous forms, such as a rack-mounted computer, a desktop computer, a laptop computer, or a tablet computer. Additionally, a computer may be embodied in a device not generally regarded as a computer, but with suitable processing capabilities, including a Personal Digital Assistant (PDA), a smart phone, a tablet, a reader, or any other suitable portable or fixed electronic device.

Also, a computer may have one or more input and output devices. These devices may be used, among other things, to present a user interface. Examples of output devices that may be used to provide a user interface include printers or display screens for visual presentation of output, and speakers or other sound generating devices for audible presentation of output. Examples of input devices that may be used for a user interface include keyboards, microphones, and pointing devices, such as mice, touch pads, and digitizing tablets.

Such computers may be interconnected by one or more networks in any suitable form, including networks such as a local area network (LAN) or a wide area network (WAN), such as an enterprise network, an intelligent network (IN) or the Internet. Such networks may be based on any suitable technology and may operate according to any suitable protocol and may include wireless networks, wired networks, and/or fiber optic networks.

Figure 15:
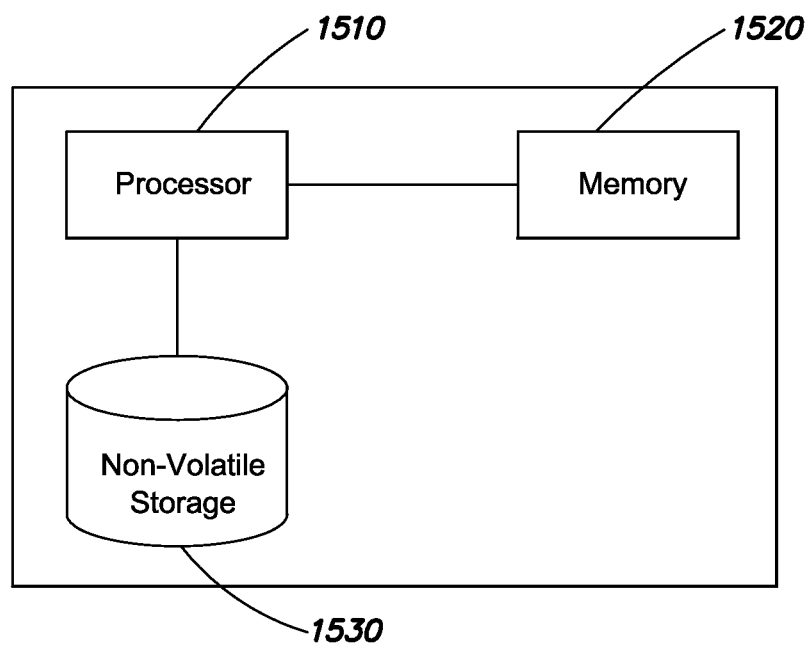
FIG. 15 is an illustrative computer system on which some embodiments of the present invention may be implemented.

A computer system that may be used in connection with any of the embodiments of the invention described herein is shown in FIG. 15. The computer system may include one or more processors 1510 and one or more non-transitory computer-readable storage media (e.g., memory 1520 and one or more non-volatile storage media 1530). The processor 1510 may control writing data to and reading data from the memory 1520 and the non-volatile storage device 1530 in any suitable manner, as the aspects of the invention described herein are not limited in this respect. To perform any of the functionality described herein, the processor 1510 may execute one or more instructions stored in one or more computer-readable storage media (e.g., the memory 1520), which may serve as non-transitory computer-readable storage media storing instructions for execution by the processor 1510.

The various methods or processes outlined herein may be coded as software that is executable on one or more processors that employ any one of a variety of operating systems or platforms. Additionally, such software may be written using any of numerous suitable programming languages and/or programming or scripting tools, and also may be compiled as executable machine language code or intermediate code that is executed on a virtual machine or a suitable framework.

In this respect, various inventive concepts may be embodied as at least one non-transitory computer-readable storage medium (e.g., a computer memory, one or more floppy discs, compact discs, optical discs, magnetic tapes, flash memories, circuit configurations in Field Programmable Gate Arrays or other semiconductor devices, etc.) article(s) encoded with one or more programs that, when executed on one or more computers or other processors, implement the various process embodiments of the present invention. The non-transitory computer-readable medium or media may be transportable, such that the program or programs stored thereon may be loaded onto any suitable computer resource to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion among different computers or processors to implement various aspects of the present invention.

Computer-executable instructions may be in many forms, such as program modules, executed by one or more computers or other devices. Generally, program modules include routines, programs, items, components, data structures, etc. that perform particular tasks or implement particular abstract data types. Typically the functionality of the program modules may be combined or distributed as desired in various embodiments.

Also, data structures may be stored in non-transitory computer-readable storage media articles in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments, or vice versa.

All definitions, as defined and used herein, should be understood to control over dictionary definitions, definitions in documents incorporated by reference, and/or ordinary meanings of the defined terms.

The indefinite articles "a" and "an," as used herein, unless clearly indicated to the contrary, should be understood to mean "at least one."

As used herein, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items.

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications, and improvements will readily occur to those skilled in the art. Such modifications and improvements are intended to be within the spirit and scope of the invention. Accordingly, the foregoing description is by way of example only, and is not intended as limiting.

The invention claimed is:

1. A computer-implemented method of refining an output of an information retrieval system based on user preferences of a user associated with a data consumer, wherein the information retrieval system is configured to facilitate access to information items of digital content, the information items comprising information on a plurality of items, the information including a plurality of item attributes of the plurality of items, wherein a respective item of the plurality of items is any suitable object or information about which the user may express preferences, and wherein a respective information item comprises item attributes corresponding to the respective item, the method comprising:
using at least one hardware processor to perform:
deriving, by a preference engine, from the user preferences, at least one first-order preference, wherein the at least one first-order preference comprises a preference among item attributes of at least one of the plurality of items;
encoding, by the preference engine, a first-order preference model comprising first-order preference attributes, wherein the first-order preference attributes comprise the user first-order preferences encoded as attributes based on at least a subset of the at least one first attribute of the first-order preferences;
deriving, by the preference engine at least one second-order preference associated with the first-order preference, wherein the at least one second-order preference comprises a preference among item attributes of the plurality of items;
encoding, by the preference engine, a second-order preference model comprising second-order preference attributes, wherein the second-order preference attributes comprise the user second-order preferences encoded as attributes based on the plurality of second attributes of the second-order preferences;
encoding a preference graph from the first-order preference model and the second-order preference model; and
accessing, by the information retrieval system, the preference graph to rank, based on the first-order and second-order preference attributes, at least a subset of the plurality of information items to obtain a ranking of the information items in the subset.

2. The method of claim 1, wherein the user preferences are based on one or more of a user context and a user profile.

3. The method of claim 1, wherein the information retrieval system comprises a synthesis engine, and wherein the synthesis engine derives parameters for synthesis from the preference model for the synthesis of the digital content.

4. The method of claim 1, wherein the information retrieval system interfaces with one or more of a search engine, a database, and a synthesis engine.

5. The method of claim 1, wherein the preference attributes are encoded as a knowledge representation and wherein the knowledge representation is graph-based, semantic based, or a combination thereof.

6. The method of claim 1, wherein the processor further performs obtaining the user preferences by receiving from the user the user preferences via at least one prompt.

7. The method of claim 1, wherein the output comprises the subset of the plurality of information items and the method further comprises presenting the output in a graphical user interface in accordance with the ranking.

8. The method of claim 1, wherein the ranking is based on a graph based model, a PageRank model, a probabilistic model, or a combination thereof.

9. The method of claim 1, wherein the at least one first-order preference and the at least one second-order preference are obtained passively or implicitly without interacting with the user.

10. A computer system for refining an output of an information retrieval system based on user preferences of a user associated with a data consumer, wherein the information retrieval system is configured to facilitate access to information items of digital content, the information items comprising information on a plurality of items, the information including a plurality of item attributes of the plurality of items, wherein a respective item of the plurality of items is any suitable object or information about which the user may express preferences, and wherein a respective information item comprises item attributes corresponding to the respective item, the computer system comprising:
  a preference engine configured to:
    derive from the user preferences, at least one first-order preference, wherein the at least one first-order preference comprises, a preference among attribute values of at least one first attribute of the plurality of items;
    encode a first-order preference model comprising first-order preference attributes, wherein the first-order preference attributes comprise the user first-order preferences encoded as attributes based on at least a subset of the at least one first attribute of the first-order preferences;
    derive at least one second-order preference associated with the first-order preference, wherein the at least one second-order preference comprises a preference among item attributes of the plurality of items;
    encode a second-order preference model comprising second-order preference attributes, wherein the second-order preference attributes comprise the user second-order preferences encoded as attributes based on the plurality of second attributes of the second-order preferences; and
  the information retrieval system configured to encode a preference graph from the first-order preference model and the second-order preference model and access the preference graph to rank, based on the first-order and second-order preference attributes, at least a subset of the plurality of information items to obtain a ranking of the information items in the subset.

11. The computer system of claim 10, where the user preferences are based on one or more of a user context and a user profile.

12. The computer system of claim 10, wherein the information retrieval system further comprises a synthesis engine, and wherein the synthesis engine is configured to derive parameters for synthesis from the preference model.

13. The computer system of claim 10, wherein the information retrieval system is configured to interface with one or more of a search engine, a database, and a synthesis engine.

14. The computer system of claim 10, wherein the preference attributes are encoded as a knowledge representation and wherein the knowledge representation is graph-based, semantic based, or a combination thereof.

15. A tangible, non-transitory computer readable medium having computer-executable instructions stored thereon for refining an output of an information retrieval system based on user preferences of a user associated with a data consumer, wherein the information retrieval system is configured to facilitate access to information items of digital content, the information items comprising information on a plurality of items, the information including a plurality of item attributes of the plurality of items, wherein a respective item of the plurality of items is any suitable object or information about which the user may express preferences, and wherein a respective information item comprises item attributes corresponding to the respective item, wherein the instructions, when executed by at least one processor, cause the computer to:
  derive, by a preference engine, from the user preferences, at least one first-order preference, wherein the at least one first-order preference comprises, a preference among item attributes of at least one of the plurality of items;
  encode, by the preference engine, a first-order preference model comprising first-order preference attributes, wherein the first-order preference attributes comprise the user first-order preferences encoded as attributes based on at least a subset of the at least one first attribute of the first-order preferences;
  derive, by the preference engine at least one second-order preference associated with the first-order preference, wherein the at least one second-order preference comprises a preference among item attributes of the plurality of items;
  encode, by the second-order preference engine, a second-order preference model comprising second-order preference attributes, wherein the second-order preference attributes comprise the user second-order preferences encoded as attributes based on the plurality of second attributes of the second-order preferences;
  encode a preference graph from the first-order preference model and the second order preference model; and
  access, by the information retrieval system, the preference graph to rank, based on the first-order and second-order preference attributes, at least a subset of the plurality of information items to obtain a ranking of the information items in the subset.

16. The computer readable medium of claim 15, wherein the user preferences are based on one or more of a user context and a user profile.

17. The computer readable medium of claim 15, wherein the information retrieval system is implemented using one or more data structures encoding instructions for executing at least an information retrieval function.

18. The computer readable medium of claim 15, wherein the preference attributes are encoded as a knowledge representation and wherein the knowledge representation is graph-based, semantic based, or a combination thereof.

19. The computer readable medium of claim 15, wherein the instructions, when executed, further cause the computer to obtain the user preferences by receiving from the user the user preferences via at least one prompt.

20. The computer readable medium of claim 15, wherein the output comprises the subset of the plurality of information items and wherein the instructions, when executed, further cause the computer to present the output in a graphical user interface in accordance with the ranking.

* * * * *